US012806971B2

(12) United States Patent
Kobayashi et al.

(10) Patent No.: US 12,806,971 B2
(45) Date of Patent: Nov. 24, 2026

(54) VEHICLE GLASS

(71) Applicant: AGC Inc., Tokyo (JP)

(72) Inventors: Yusuke Kobayashi, Tokyo (JP); Kenji Kitaoka, Tokyo (JP)

(73) Assignee: AGC Inc., Tokyo (JP)

( * ) Notice: Subject to any disclaimer, the term of this patent is extended or adjusted under 35 U.S.C. 154(b) by 151 days.

(21) Appl. No.: 19/006,408

(22) Filed: Dec. 31, 2024

(65) Prior Publication Data

US 2025/0128575 A1 Apr. 24, 2025

Related U.S. Application Data

(63) Continuation of application No. PCT/JP2023/025877, filed on Jul. 13, 2023.

(30) Foreign Application Priority Data

Jul. 13, 2022 (JP) ................................ 2022-112555

(51) Int. Cl.
*B60J 1/00* (2006.01)
*B60J 1/02* (2006.01)

(52) U.S. Cl.
CPC ................ *B60J 1/008* (2013.01); *B60J 1/02* (2013.01)

(58) Field of Classification Search
CPC ........................................................ B60J 1/008
See application file for complete search history.

(56) References Cited

U.S. PATENT DOCUMENTS 1,703,122 A * 2/1929 Thielker .................... B60J 1/02 296/84.1
2023/0001772 A1 1/2023 Nagashima et al.

FOREIGN PATENT DOCUMENTS

WO WO 2021/041839 A1 3/2021
WO WO 2021/182290 A1 9/2021

OTHER PUBLICATIONS

International Search Report issued Oct. 3, 2023 in PCT/JP2023/025877 filed on Jul. 13, 2023, 2 pages.

* cited by examiner

*Primary Examiner* — Nicholas McFall
(74) *Attorney, Agent, or Firm* — Oblon, McClelland, Maier & Neustadt, L.L.P.

(57) ABSTRACT

There is provided a vehicle glass that appropriately transmits far-infrared rays and has shock resistance. A vehicle glass (1) includes a glass member (10) in which an opening (19) penetrating the glass member (10) from a surface on a vehicle exterior side to a surface on a vehicle interior side is formed and a transmissive member (20) that is disposed in the opening (19), and has an average internal transmittance of 50% or more for light having a wavelength of 8 μm to 13 μm. A ratio Sa/Sb of fracture velocity Sa [km/h] measured on a surface on the vehicle of the transmissive member (20) by a chart stone chipping test and fracture velocity Sb [km/h] measured on the surface on the vehicle exterior side of the glass member (10) is 0.7 or more.

20 Claims, 11 Drawing Sheets

VEHICLE GLASS

FIELD

The present invention relates to a vehicle glass.

BACKGROUND

In recent years, a far-infrared ray camera has been sometimes attached to an automobile. Usually, window glass of an automobile does not transmit far-infrared rays having wavelengths of 8 μm to 13 μm. For that reason, for example, Patent Literature 1 describes that an opening is formed in a vehicle glass and a transmissive member that transmits a far-infrared ray is provided in the opening. Accordingly, the far-infrared ray transmitted through the transmissive member can be detected by a far-infrared camera.

CITATION LIST

Patent Literature

Patent Literature 1: WO 2021/182290 A

SUMMARY

Technical Problem

Such a transmissive member may be damaged when a foreign matter such as a flying stone collides with the transmissive member. Therefore, it is demanded to appropriately transmit far-infrared rays and impart shock resistance to the transmissive member.

An object of the present invention is to provide a vehicle glass that appropriately transmits far-infrared rays and has shock resistance.

Solution to Problem

The vehicle glass of the present disclosure comprises a glass member in which an opening penetrating the glass member from a surface on a vehicle exterior side to a surface on a vehicle interior side is formed; and a transmissive member that is disposed in the opening, and has an average internal transmittance of 50% or more for light having a wavelength of 8 μm to 13 μm, wherein a ratio Sa/Sb of fracture velocity Sa [km/h] measured on a surface on the vehicle exterior side of the transmissive member by a chart stone chipping test and fracture velocity Sb [km/h] measured on the surface on the vehicle exterior side of the glass member is 0.7 or more.

Advantageous Effects of Invention

According to the present invention, it is possible to provide a vehicle glass that appropriately transmits far-infrared rays and has shock resistance.

DESCRIPTION OF EMBODIMENTS

A preferred embodiment of the present invention is explained in detail below with reference to the accompanying drawings. Note that the present invention is not limited by the embodiment. When there are a plurality of embodiments, the present invention includes a combination of the embodiments. A numerical value includes a range of rounding.

(Vehicle)

Figure 1:
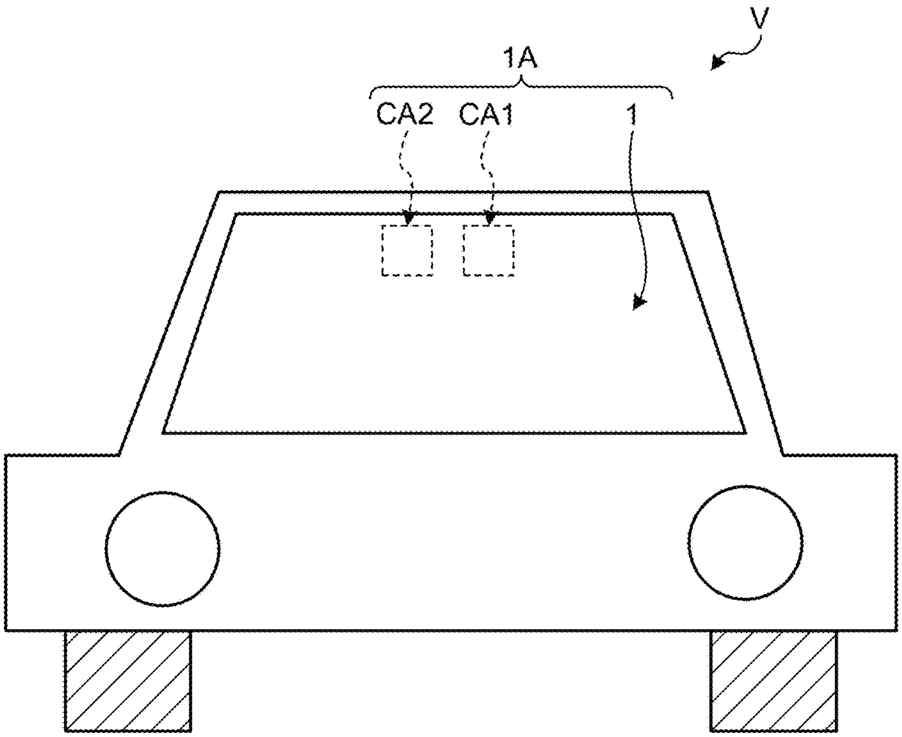
FIG. 1 is a schematic diagram illustrating a state in which a vehicle glass according to an embodiment is mounted on a vehicle.

FIG. 1 is a schematic diagram illustrating a state in which a vehicle glass according to the present embodiment is mounted on a vehicle. As illustrated in FIG. 1, a vehicle glass 1 according to the present embodiment is mounted on a vehicle V. The vehicle glass 1 is a window member applied to a windshield of the vehicle V. That is, the vehicle glass 1 is used as a windshield of the vehicle V, in other words, windshield glass. A far-infrared camera CA1 and a visible light camera CA2 are mounted the inside (an interior) of the vehicle V. Note that the inside (the interior) of the vehicle V indicates, for example, a vehicle interior in which a driver's seat of a driver is provided. The vehicle glass 1 is not limited to being applied to the windshield of the vehicle V, and may be mounted at any position of the vehicle V.

The vehicle glass 1, the far-infrared camera CA1, and the visible light camera CA2 configure a camera unit 1A according to the present embodiment. The far-infrared camera CA1 is a camera that detects a far-infrared ray. The far-infrared camera CA1 detects a far-infrared ray from the outside of the vehicle V to capture a thermal image of the outside of the vehicle V. The visible light camera CA2 is a camera that detects visible light. The visible light camera CA2 detects visible light from the outside of the vehicle V to capture an image of the outside of the vehicle V. Note that the camera unit 1A may a camera unit including at least the vehicle glass 1 and the far-infrared camera CA1. Besides the far-infrared camera CA1 and the visible light camera CA2, the camera unit 1A may further include, for example, a LiDAR or a millimeter wave radar. Here, a far-infrared ray is, for example, an electromagnetic wave having a wavelength in a wavelength band of 8 μm to 13 μm and visible light is, for example, an electromagnetic wave having a wavelength in a wavelength band of 660 nm to 860 nm. Note that the far-infrared ray may be an electromagnetic wave having a wavelength in a wavelength band of 8 μm to 13 μm. A numerical value range represented using "to" means a range including numerical values described before and after "to" as a lower limit value and an upper limit value.

(Vehicle Glass)

Figure 2:
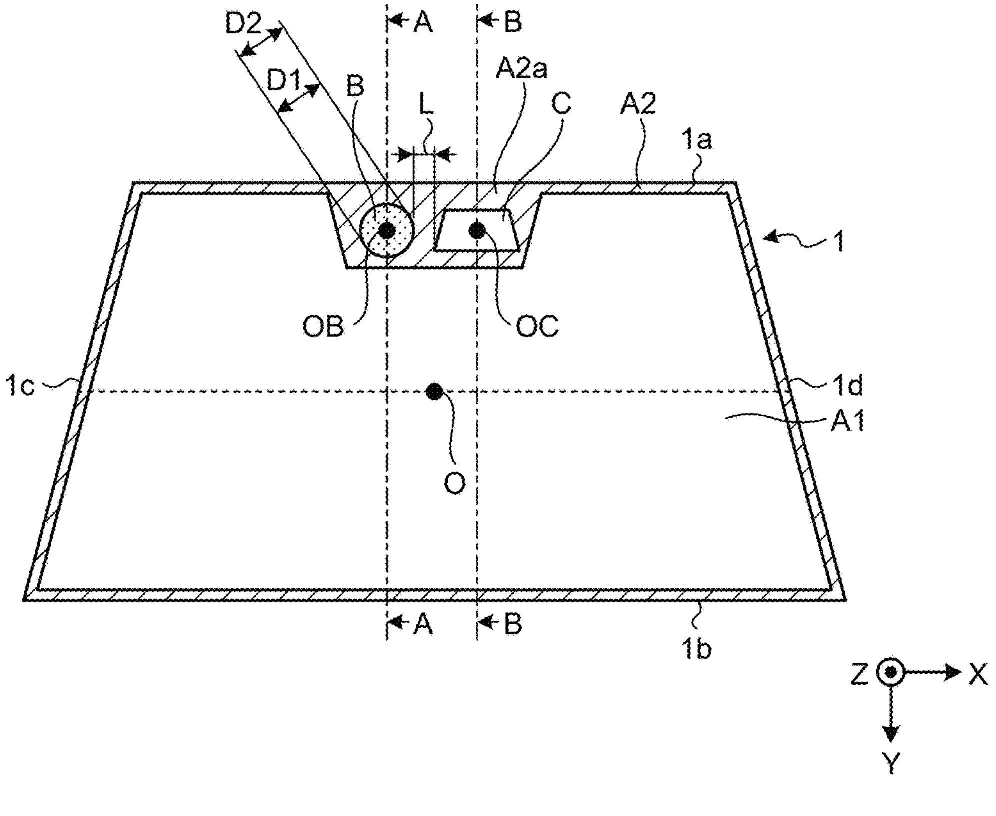
FIG. 2 is a schematic plan view of the vehicle glass according to the embodiment.
Figure 3:
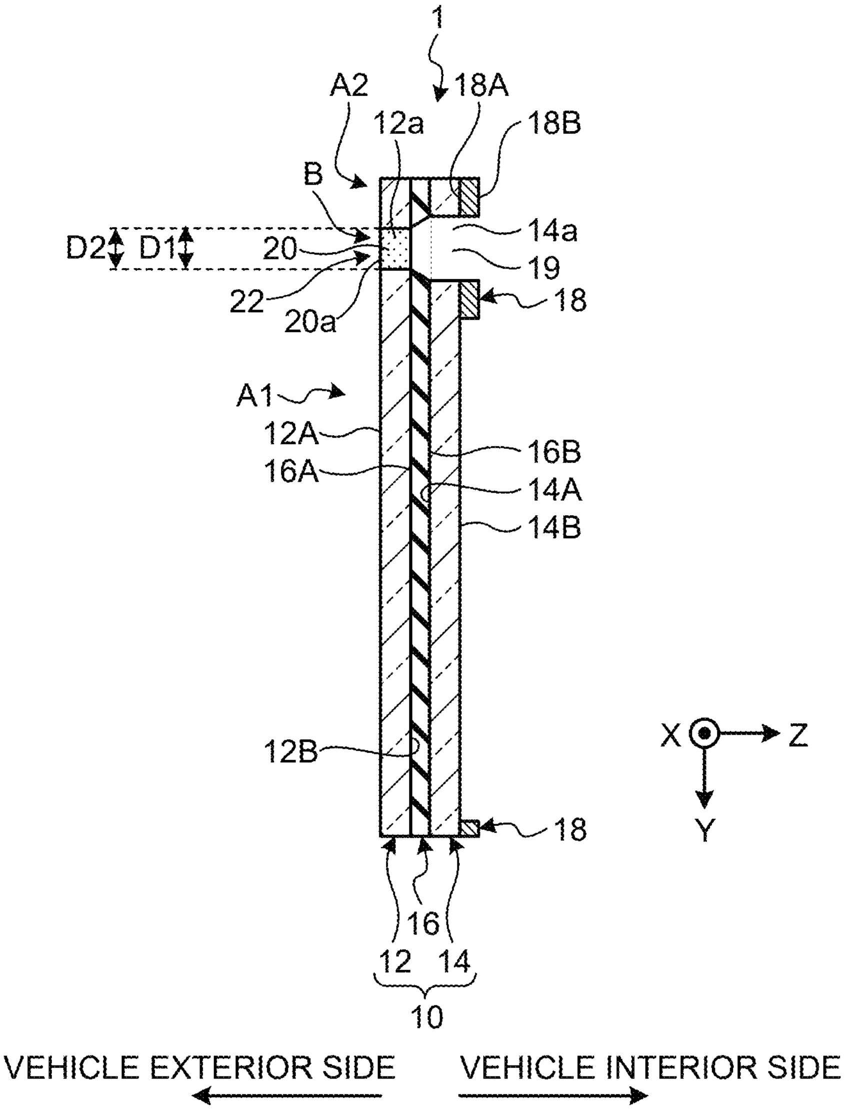
FIG. 3 is a sectional view taken along an A-A line in FIG. 2.
Figure 4:
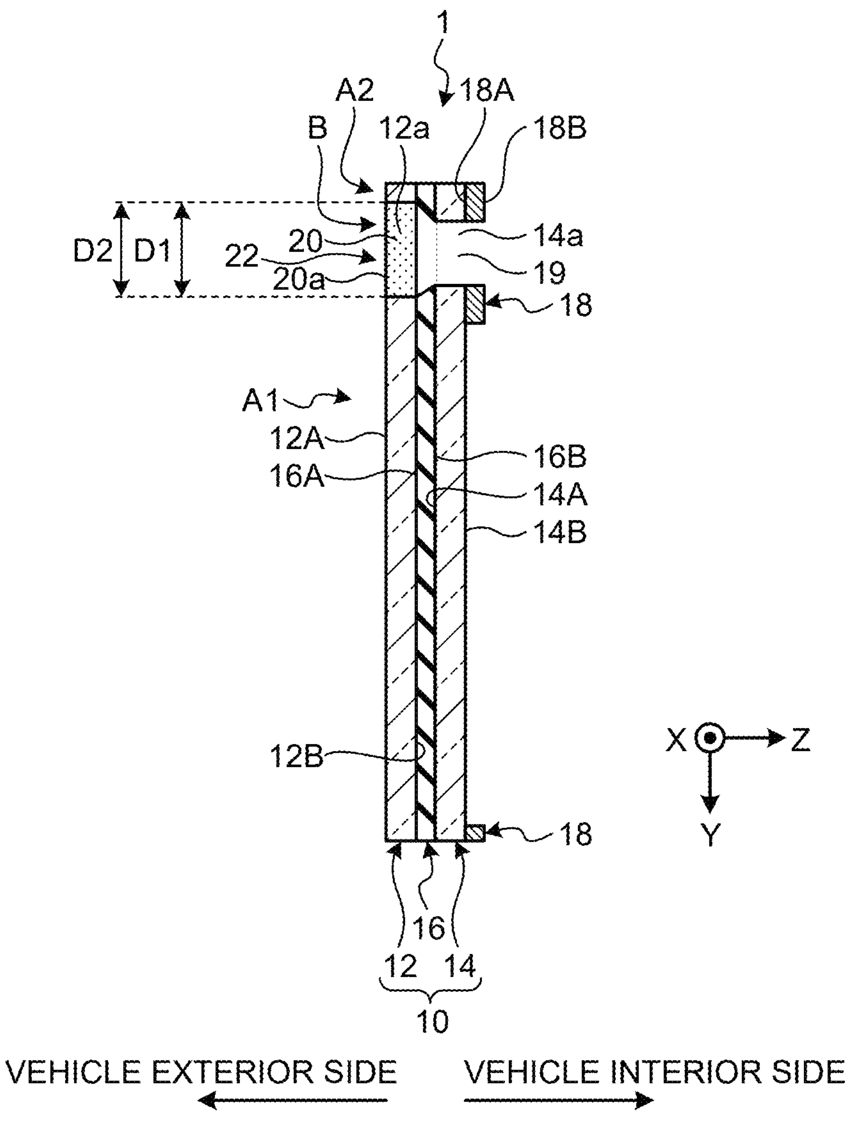
FIG. 4 is a sectional view taken along the A-A in FIG. 2.
Figure 5:
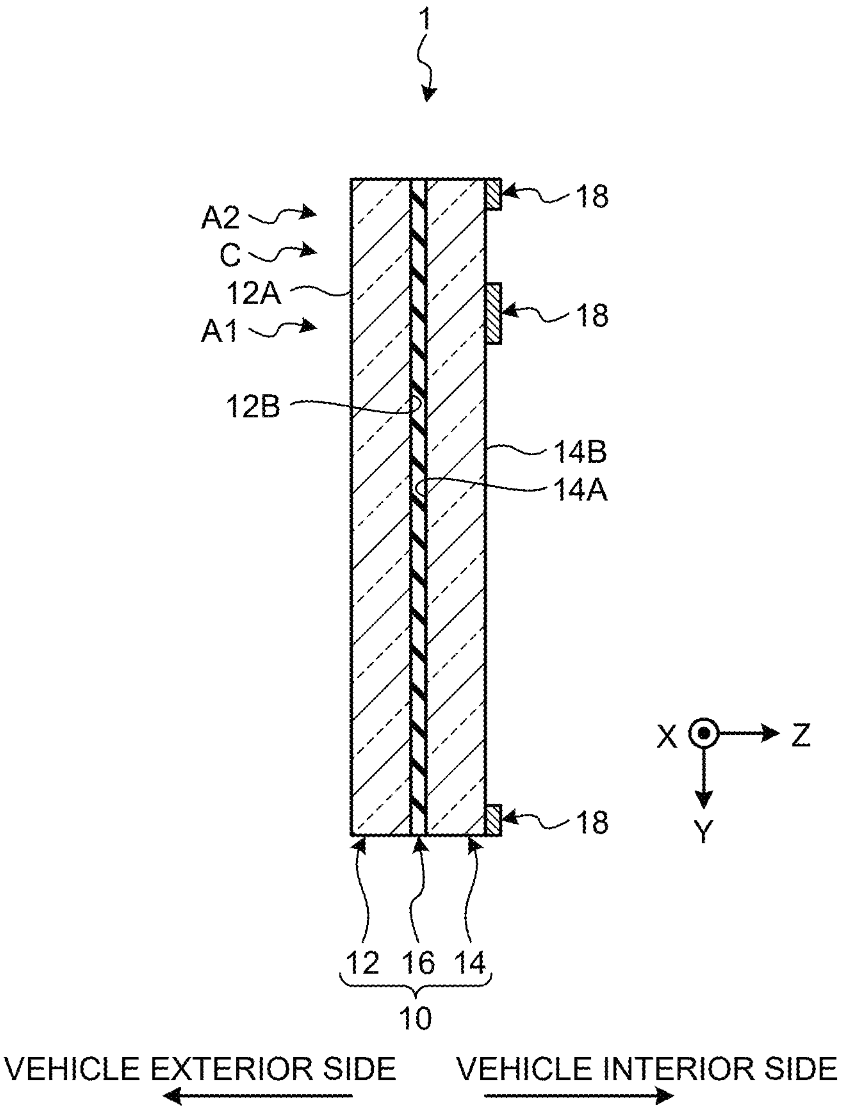
FIG. 5 is a sectional view taken along a B-B cross section in FIG. 2.

FIG. 2 is a schematic plan view of the vehicle glass according to the present embodiment. FIG. 3 and FIG. 4 are sectional views taken along an A-A line in FIG. 2. FIG. 3 is a sectional view in the case in which a glass opening dimension of a vehicle interior surface is larger than an opening dimension of a vehicle exterior surface. FIG. 4 is a sectional view in the case in which the glass opening dimension of the vehicle exterior surface is larger than the opening dimension of the vehicle interior surface. FIG. 5 is a sectional view taken along a B-B cross section in FIG. 2. As illustrated in FIG. 2, in the following explanation, the upper edge of the vehicle glass 1 is referred to as upper edge 1*a*, the lower edge of the vehicle glass 1 is referred to as lower edge 1*b*, one side edge of the vehicle glass 1 is referred to as side edge 1*c*, and the other side edge of the vehicle glass 1 is referred to as side edge 1*d*. The upper edge 1*a* is an edge portion located on the vertically upper side when the vehicle glass 1 is mounted on the vehicle V. The lower edge 1*b* is an edge portion located on the lower side in the vertical direction when the vehicle glass 1 is mounted on the vehicle V. The side edge 1*c* is an edge portion located on one side when the vehicle glass 1 is mounted on the vehicle V. The side edge 1*d* is an edge portion located on the other side when the vehicle glass 1 is mounted on the vehicle V.

In the following explanation, among directions parallel to the surface of the vehicle glass 1, a direction from the upper edge 1*a* toward the lower edge 1*b* is referred to as Y direction and a direction from the side edge 1*c* toward the side edge 1*d* is referred to as X direction. In the present embodiment, the X direction and the Y direction are orthogonal. A direction orthogonal to the surface of the vehicle glass 1, that is, the thickness direction of the vehicle glass 1 is referred to as Z direction. The Z direction is, for example, a direction from the vehicle exterior side of the vehicle V toward the vehicle interior side of the vehicle V when the vehicle glass 1 is mounted on the vehicle V. The X direction and the Y direction are along the surface of the vehicle glass 1 but may be directions in contact with the surface of the vehicle glass 1 at a center point O of the vehicle glass 1, for example, when the surface of the vehicle glass 1 is a curved surface. The center point O is the center position of the vehicle glass 1 in the case in which the vehicle glass 1 is viewed from the Z direction.

A light transmitting region A1 and a light blocking region A2 are formed in the vehicle glass 1. The light transmitting region A1 is a region occupying the central portion of the vehicle glass 1 when viewed from the Z direction. The light transmitting region A1 is a region for securing the visual field of a driver. The light transmitting region A1 is a region that transmits visible light. The light blocking region A2 is a region formed around the light transmitting region A1 when viewed from the Z direction. The light blocking region A2 is a region that blocks visible light. In the light blocking region A2, a far-infrared ray transmitting region B and a visible light transmitting region C are formed in a light blocking region A2*a*, which is a portion on the upper edge 1*a* side.

The far-infrared ray transmitting region B is a region that transmits a far-infrared ray and is a region where the far-infrared camera CA1 is provided. That is, the far-infrared camera CA1 is provided at a position overlapping the far-infrared ray transmitting region B when viewed from the optical axis direction of the far-infrared camera CA1. The visible light transmitting region C is a region that transmits visible light and is a region where the visible light camera CA2 is provided. That is, the visible light camera CA2 is provided at a position overlapping the visible light transmitting region C when viewed from the optical axis direction of the visible light camera CA2.

As explained above, since the far-infrared ray transmitting region B and the visible light transmitting region C are formed in the light blocking region A2, the light blocking region A2 blocks a far-infrared ray in a region other than a region where the far-infrared ray transmitting region B is formed and blocks visible light in a region other than the region where the visible light transmitting region C is formed. The light blocking region A2*a* is formed around the far-infrared ray transmitting region B and the visible light transmitting region C. The light blocking region A2*a* is preferably provided around the far-infrared ray transmitting region B and the visible light transmitting region C as explained above because various sensors are protected from sunlight. Wiring of the various sensors is preferably invisible from the outside of the vehicle from the viewpoint of designability. However, the position where the far-infrared ray transmitting region B is formed is not limited to the inside of the light blocking region A2 and may be optional.

As illustrated in FIG. 3 and FIG. 4, the vehicle glass 1 includes a glass member 10. The glass member 10 includes a glass substrate 12 (a first glass substrate), a glass substrate 14 (a second glass substrate), an intermediate layer 16, and a light blocking layer 18. In the glass member 10, the glass substrate 12, the intermediate layer 16, the glass substrate 14, and the light blocking layer 18 are stacked in this order in the Z direction. The glass substrate 12 and the glass substrate 14 are fixed (bonded) to each other with the intermediate layer 16 interposed therebetween.

As the glass substrates 12 and 14, for example, soda-lime glass, borosilicate glass, and aluminosilicate glass can be used. The intermediate layer 16 is an adhesive layer that bonds the glass substrate 12 and the glass substrate 14. As the intermediate layer 16, for example, a polyvinyl butyral (hereinafter also referred to as PVB) modified material, an ethylene-vinyl acetate copolymer (EVA)-based material, a urethane resin material, or a vinyl chloride resin material can be used. More specifically, the glass substrate 12 includes one surface 12A and the other surface 12B. The other surface 12B is in contact with one surface 16A of the intermediate layer 16 and fixed (bonded) to the intermediate layer 16. The glass substrate 14 includes one surface 14A and the other surface 14B. The one surface 14A is in contact with the other surface 16B of the intermediate layer 16 and fixed (bonded) to the intermediate layer 16. As explained above, the glass member 10 is a laminated glass obtained by stacking the glass substrate 12 and the glass substrate 14. However, the glass member 10 is not limited to the laminated glass and may include, for example, only one of the glass substrate 12 and the glass substrate 14. In this case, the intermediate layer 16 may not be provided either.

The light blocking layer 18 includes one surface 18A and the other surface 18B. The one surface 18A is fixed in contact with the other surface 14B of the glass substrate 14. The light blocking layer 18 is a layer that blocks visible light and is preferably a layer that blocks visible light and ultraviolet light. As the light blocking layer 18, for example, a ceramic light blocking layer or a light blocking film can be used. As the ceramic light blocking layer, for example, a ceramic layer made of a material publicly known in the past such as a black ceramic layer can be used. As the light blocking film, for example, a light blocking polyethylene terephthalate (PET) film, a light blocking polyethylene naphthalate (PEN) film, or a light blocking polymethyl methacrylate (PMMA) film can be used.

In the present embodiment, in the glass member 10, a side on which the light blocking layer 18 is provided is the inner side (the vehicle interior side) of the vehicle V and a side on which the glass substrate 12 is provided is the outer side (the vehicle exterior side) of the vehicle V. However, not only this, but the light blocking layer 18 may be the outer side of the vehicle V. When the vehicle glass 1 is made of the laminated glass of the glass substrates 12 and 14, the light blocking layer 18 may be formed between the glass substrate 12 and the glass substrate 14.

(Light Blocking Region)

The light blocking region A2 is formed by providing the light blocking layer 18 in the glass member 10. That is, the light blocking region A2 is a region in which the glass member 10 includes the light blocking layer 18. That is, the light blocking region A2 is a region where the glass substrate 12, the intermediate layer 16, the glass substrate 14, and the light blocking layer 18 are stacked. On the other hand, the light transmitting region A1 is a region where the glass member 10 does not include the light blocking layer 18. That is, the light transmitting region A1 is a region where the glass substrate 12, the intermediate layer 16, and the glass substrate 14 are stacked and the light blocking layer 18 is not stacked.

(Far-Infrared Ray Transmitting Region)

As illustrated in FIG. 3 and FIG. 4, an opening 19 penetrating the glass member 10 from one surface (here, the surface 12A) to the other surface (here, the surface 14B) in the Z direction is formed. A transmissive member 20 that transmits far-infrared rays is provided in the opening 19. A region where the opening 19 is formed and the transmissive member 20 is provided is the far-infrared ray transmitting region B. That is, the far-infrared ray transmitting region B is a region where the opening 19 and the transmissive member 20 arranged in the opening 19 are provided. Since the light blocking layer 18 does not transmit far-infrared rays, the light blocking layer 18 is not provided in the far-infrared ray transmitting region B. That is, in the far-infrared ray transmitting region B, the glass substrate 12, the intermediate layer 16, the glass substrate 14, and the light blocking layer 18 are not provided and the transmissive member 20 is provided in the formed opening 19. The transmissive member 20 will be described later. Note that it can be said that the vehicle glass 1 includes the glass member 10 and the transmissive member 20 provided in the opening 19 of the glass member 10. The glass member 10 can also be called portion configuring a window glass in the vehicle glass 1. For example, here, a component including the glass substrates 12 and 14, the intermediate layer 16, and the light blocking layer 18 may be called glass member 10. However, as explained above, the glass member 10 may include at least one of the glass substrate 12 and the glass substrate 14.

(Visible Light Region)

As illustrated in FIG. 5, like the light transmitting region A1, the visible light transmitting region C is a region where the glass member 10 does not include the light blocking layer 18 in the Z direction. That is, the visible light transmitting region C is a region where the glass substrate 12, the intermediate layer 16, and the glass substrate 14 are stacked and the light blocking layer 18 is not stacked.

As illustrated in FIG. 2, the visible light transmitting region C is preferably provided in the vicinity of the far-infrared ray transmitting region B. Specifically, the center of the far-infrared ray transmitting region B viewed from the Z direction is represented as a center point OB and the center of the visible light transmitting region C viewed from the Z direction is represented as a center point OC. When the shortest distance between the far-infrared ray transmitting region B (the opening 19) and the visible light transmitting region C when viewed from the Z direction is represented as a distance L, the distance L is preferably more than 0 mm and 100 mm or less and more preferably 10 mm or more and 80 mm or less. Although not illustrated here, when a plurality of visible light transmitting regions C are present, a relation with one of the visible light transmitting regions C is illustrated. By setting the visible light transmitting region C to a position within this range with respect to the far-infrared ray transmitting region B, it is possible to appropriately capture an image with the visible light camera CA2 with a perspective distortion amount in the visible light transmitting region C suppressed while making it possible to capture an image at a close position with the far-infrared camera CA1 and the visible light camera CA2. By capturing the image at the close position close with the far-infrared camera CA1 and the visible light camera CA2, a load in performing arithmetic processing on data obtained from the respective cameras is reduced and a power supply and a signal cable are also suitably laid.

As illustrated in FIG. 2, the visible light transmitting region C and the far-infrared ray transmitting region B are preferably located side by side in the X direction. That is, it is preferable that the visible light transmitting region C is not located on the Y direction side of the far-infrared ray transmitting region B and is located side by side with the far-infrared ray transmitting region B in the X direction. By disposing the visible light transmitting region C side by side with the far-infrared ray transmitting region B in the X direction, a parallax between the far-infrared camera and the visible light camera can be reduced as much as possible, an object recognition rate of a target object is improved and the visible light transmitting region C can be disposed in the vicinity of the upper edge 1*a*. Therefore, it is possible to appropriately secure the visual field of the driver in the light transmitting region A1. Here, being positioned side by side in the X direction means being within a range of ±50 mm with respect to the Y direction.

(Transmissive Member)

Figure 6:
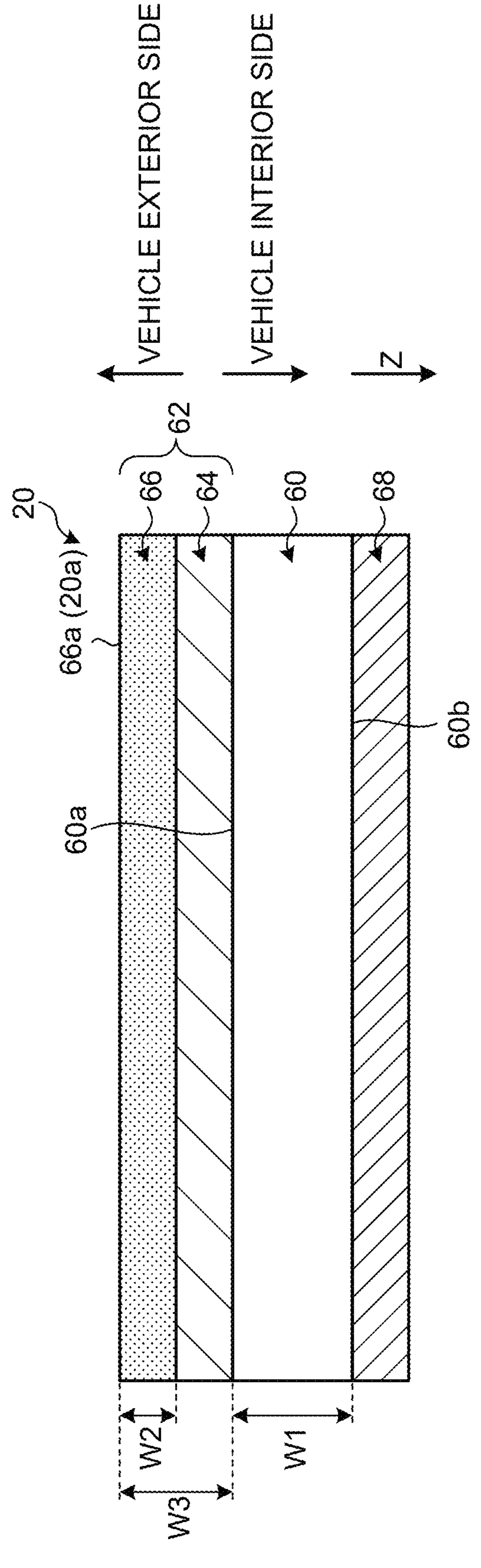
FIG. 6 is a schematic sectional view of a transmissive member according to the embodiment.

The transmissive member 20 provided in the far-infrared ray transmitting region B is specifically explained below. FIG. 6 is a schematic sectional view of the transmissive member according to the present embodiment. As illustrated in FIG. 6, the transmissive member 20 includes a base material 60, a first functional film 62 serving as a functional film formed on the base material 60 and a second functional film 68 formed on the base material 60. In the present embodiment, the first functional film 62 is formed on one surface 60*a* of the base material 60. The surface 60*a* is a surface that is the vehicle exterior side when the transmissive member 20 is mounted on the vehicle glass 1. The second functional film 68 is formed on the other surface 60*b* of the base material 60. The surface 60*b* is a surface on the vehicle interior side when the transmissive member 20 is mounted on the vehicle glass 1. However, the first functional film 62 and the second functional film 68 are not essential components. The transmissive member 20 may include only the base material 60, may include the base material 60 and the first functional film 62, or may include the base material 60 and the second functional film 68.

In the present embodiment, the transmissive member 20 is provided in the light blocking region A2 of the vehicle glass 1 that is the window member of the vehicle V.

However, not only this, but the transmissive member 20 may be provided in any exterior member of the vehicle V such as an exterior member for a pillar of the vehicle V. The transmissive member 20 is not limited to be provided in the vehicle V and may be used for any use.

A not-illustrated frame member may be provided in the outer peripheral edge of the transmissive member 20. The transmissive member 20 may be attached to the opening 19 via the frame member.

(Base Material)

The base material 60 is a member capable of transmitting far-infrared rays. The internal transmittance of the base material 60 for light (a far-infrared ray) having a wavelength of 10 μm explained below is preferably 50% or more, more preferably 60% or more, and still more preferably 70% or more. The average internal transmittance of the base material 60 for light (a far-infrared ray) having a wavelength of 8 μm to 13 μm is preferably 50% or more, more preferably 60% or more, and still more preferably 70% or more. Since the internal transmittance of the base material 60 at 10 μm and the average internal transmittance of the base material 60 at 8 μm to 13 μm fall within these numerical value ranges, it is possible to appropriately transmit far-infrared rays and sufficiently exert, for example, the performance of the far-infrared camera CA1.

A refractive index of the base material 60 for the light having the wavelength of 10 μm is preferably 1.5 or more and 4.1 or less, more preferably 2.0 or more and 4.1 or less, and still more preferably 2.2 or more and 4.01 or less. An average refractive index of the base material 60 for the light having the wavelength of 8 μm to 13 μm is preferably 1.5 or more and 4.1 or less, more preferably 2.0 or more and 4.1 or less, and still more preferably 2.2 or more and 4.01 or less. Since the refractive index and the average refractive index of the base material 60 fall within these numerical value ranges, it is possible to appropriately transmit far-infrared ray and, for example, sufficiently exert the performance of the far-infrared camera CA1 Note that the average refractive index here is an average value of refractive indexes for light having the respective wavelengths in the wavelength band (here, 8 μm to 13 μm). The refractive index can be determined by performing fitting of an optical model using, for example, polarization information obtained by an infrared spectroscopic ellipsometer (IR-VASE-UT manufactured by J. A. Woollam Co., Ltd.) and a spectral transmission spectrum obtained by a Fourier transform infrared spectrometer.

Thickness W1 of the base material 60 is preferably 0.5 mm or more and 5 mm or less, more preferably 1 mm or more and 5 mm or less, still more preferably 1 mm or more and 4 mm or less, and yet still more preferably 1.5 mm or more and 3 mm or less. Since the thickness W1 is in this range, it is possible to appropriately transmit far-infrared rays while ensuring strength. Note that the thickness W1 can also be said to be length in the Z direction from the surface 60*a* to the surface 60*b* of the base material 60.

The material of the base material 60 is not particularly limited and examples of the material include Si, Ge, ZnS, and chalcogenide glass. It can be said that the base material 60 preferably includes at least one kind of a material selected from a group of Si, Ge, ZnS, and chalcogenide glass. By using such a material for the base material 60, it is possible to appropriately transmit far-infrared rays.

A preferred composition of the chalcogenide glass is a composition containing:

in atom % indication,
Ge+Ga; 7% to 25%,
Sb; 0% to 35%,
Bi; 0% to 20%,
Zn; 0% to 20%,
Sn; 0% to 20%,
Si; 0% to 20%,
La; 0% to 20%,
S+Se+Te; 55% to 80%,
Ti; 0.005% to 0.3%,
Li+Na+K+Cs; 0% to 20%, and
F+Cl+Br+I; 0% to 20%. The glass preferably has a glass transition point (Tg) of 140 °C to 550 °C.

As the material of the base material 60, it is more preferable to use at least one kind among Si, Ge, and ZnS and it is still more preferable to use Si.

(First Functional Film)

The first functional film 62 is formed on the surface 60*a* on the vehicle exterior side outer side of the base material 60. The first functional film 62 includes an intermediate layer 64 and an outermost layer 66. The outermost layer 66 is a layer provided at a part farthest from the base material 60 in the first functional film 62, that is, on the most vehicle exterior side in the present embodiment. In other words, the outermost layer 66 is the outermost layer (the most vehicle exterior side in the present embodiment) of the transmissive member 20 and is exposed to the outside.

The intermediate layer 64 is a layer provided further on the base material 60 side than the outermost layer 66 (further on the vehicle interior side than the outermost layer 66 in the present embodiment) in the first functional film 62. That is, the intermediate layer 64 is provided between the base material 60 and the outermost layer 66. However, the first functional film 62 may not include the intermediate layer 64 and may include only the outermost layer 66.

(Outermost Layer)

The outermost layer 66 is a layer containing $ZrO_2$ as a main component. Here, the main component may indicate that content with respect to the entire the outermost layer 66 is 50 mass % or more. In the outermost layer 66, the content of $ZrO_2$ is 50 mass % or more and 100 mass % or less, preferably 70 mass % or more and 100 mass % or less, and more preferably 90 mass % or more and 100 mass % or less with respect to the entire outermost layer 66. In the outermost layer 66, the content of $ZrO_2$ is preferably 100 mass % excluding $ZrO_2$ alone, that is, inevitable impurities. In the outermost layer 66, since the content of $ZrO_2$ falls within this range, it is possible to appropriately transmit far-infrared rays and improve shock resistance.

The outermost layer 66 may contain a sub-component that is a component other than the main component of $ZrO_2$. The sub-component is preferably an oxide that transmits far-infrared rays and examples of the sub-component include at least one kind of $NiO_x$, ZnO, $Bi_2O_3$, and $CuO_x$.

The thickness W2 of the outermost layer 66 is preferably 20 nm or more, more preferably 50 nm or more and 600 nm or less, still more preferably 100 nm or more and 600 nm or less, and most preferably 150 nm or more and 250 nm or less. Note that it can also be said that the thickness W2 is length in the Z direction from the surface on the Z direction side of the outermost layer 66 to the surface on the opposite side to the Z direction.

A ratio of the thickness W2 of the outermost layer 66 to the thickness W1 of the base material 60 is preferably 0.002% or more and 0.060% or less, more preferably 0.005% or more and 0.020% or less, and still more preferably 0.008% or more and 0.013% or less.

A ratio of the thickness W2 of the outermost layer 66 to the thickness W3 of the first functional film 62 is preferably 1% or more and 25% or less, more preferably 3% or more and 25% or less, still more preferably 5% or more and 25% or less, and most preferably 7% or more and 21% or less. It can also be said that the thickness W3 of the first functional film 62 is length in the Z direction from the surface on the Z direction side of the first functional film 62 to the surface on the opposite side to the Z direction.

Since the thickness W2 is in this range, it is possible to appropriately transmit far-infrared rays and appropriately improve scratch resistance.

A surface of the outermost layer 66 on the side opposite to the base material 60 is represented as a surface 66*a*. The surface 66*a* is a surface on the side exposed to the outside. In the present embodiment, it can be said that the surface 66*a* is a surface on the vehicle exterior side. In this case, arithmetic average roughness Ra (surface roughness) of the surface 66*a* of the outermost layer 66 is preferably 7.0 nm or less, more preferably 5.0 nm or less, still more preferably 4.0 nm or less, and most preferably 60 nm or less. Since the arithmetic average roughness Ra of the surface 66*a* falls within this range, it is possible to reduce changes in a dynamic coefficient of friction and surface roughness before and after scratch and improve scratch resistance. Note that the arithmetic average roughness Ra indicates arithmetic average roughness Ra defined in JIS B 0601:2001.

The outermost layer 66 is capable of transmitting far-infrared rays. An extinction coefficient of the outermost layer 66 for light having a wavelength of 10 μm is preferably 0.10 or less, more preferably 0.05 or less, and still more preferably 0.04 or less. The extinction coefficient can be determined by performing fitting of an optical model using, for example, polarization information obtained by an infrared spectroscopic ellipsometer (IR-VASE-UT manufactured by J. A. Woollam Co., Ltd.) and a spectral transmission spectrum obtained by a Fourier transform infrared spectrometer.

The refractive index of the outermost layer 66 for light having a wavelength of 550 nm (visible light) is preferably 2.05 or more, more preferably 2.05 or more and 2.40 or less, still more preferably 2.10 or more and 2.60 or less, and particularly preferably 2.15 or more and 2.25 or less. Since the refractive index of the outermost layer 66 for the visible light falls within this numerical value range, it is possible to improve the deneseness of the film of the outermost layer 66 and more appropriately improve the scratch resistance. The refractive index of the light having the wavelength of 550 nm can be determined by performing fitting of an optical model using, for example, polarization information obtained by a spectroscopic ellipsometer (manufactured by J. A. Woollam, M-2000) and spectral transmittance measured based on JIS R3106.

(Intermediate Layer)

The intermediate layer 64 can transmit far-infrared rays. In an example of the present embodiment, the intermediate layer 64 includes an antireflection layer. In the following explanation, an example in which the intermediate layer 64 is configured by only one antireflection layer is explained. However, not only this, but the intermediate layer 64 may be configured by stacking a plurality of layers.

(Antireflection Layer)

The antireflection layer included in the intermediate layer 64 is a layer containing $NiO_x$ as a main component. Here, the main component may indicate that the content with respect to the entre antireflection layer is 50 mass % or more. In the antireflection layer, the content of $NiO_x$ is 50 mass % or more and 100 mass % or less, preferably 70 mass % or more and 100 mass % or less, and more preferably 90 mass % or more and 100 mass % or less with respect to the entire antireflection layer. In the antireflection layer, a content of $NiO_x$ excluding a simple substance of $NiO_x$, that is, inevitable impurities is preferably 100 mass %. In the antireflection layer, since the content of $NiO_x$ is within this range, it is possible to suppress the reflection of far-infrared rays and appropriately transmit the far-infrared rays.

Note that it is known that nickel oxide takes a plurality of compositions according to the valence of nickel. X can take any value of 0.5 to 2. The valence may not be single and two or more kinds of valences may be mixed. In the present embodiment, NiO is preferably used as $NiO_x$. However, the material of the antireflection layer is not limited those and may be optional and may be, for example, a layer containing at least one kind among ZnS, Ge, Si, MgO, ZnO, and $Bi_2O_3$.

The thickness of the antireflection layer included in the intermediate layer 64 is preferably 1000 nm or more and 2000 nm or less, more preferably 1000 nm or more and 1500 nm or less, and still more preferably 1100 nm or more and 1600 nm or less. A ratio of the thickness of the antireflection layer to the thickness W2 of the outermost layer 66 is preferably 75% or more and 99% or less, more preferably 75% or more and 97% or less, still more preferably 75% or more and 95% or less, and most preferably 79% or more and 93% or less. Since the thickness of the antireflection layer is in this range, it is possible to suppress reflection of far-infrared rays and appropriately transmit the far-infrared rays. Note that it can also be said that the thickness of the antireflection layer is the length in the Z direction from the surface on the Z direction side of the antireflection layer to the surface on the opposite side to the Z direction.

The antireflection layer included in the intermediate layer 64 can transmit far-infrared rays. The antireflection layer has an extinction coefficient for light having a wavelength of 10 μm of preferably 0.05 or less, more preferably 0.03 or less, still more preferably 0.02 or less, and most preferably 0.01 or less. Since the extinction coefficient is in this range, it is possible to appropriately transmit a far-infrared ray.

In the antireflection layer included in the intermediate layer 64, an extinction coefficient for light (visible light) having a wavelength of 550 nm is preferably 0.04 or more, more preferably 0.06 or more, still more preferably 0.08 or more, and most preferably 0.10 or more. Since the extinction coefficient of the antireflection layer for the visible light falls within this numerical value range, it is possible to appropriately suppress reflectance dispersion of the visible light and achieve an appearance that secures designability.

(Hue Adjustment Layer)

As explained above, in the intermediate layer 64, a layer other than the antireflection layer may be provided. In this case, for example, in the intermediate layer 64, a hue adjustment layer may be provided further on the outermost layer 66 side than the antireflection layer. That is, in this case, it can be said that the base material 60, the antireflection layer, the hue adjustment layer, and the outermost layer 66 may be stacked in this order toward the vehicle exterior side.

The hue adjustment layer is a layer capable of transmitting far-infrared rays. The hue adjustment layer includes a first layer and a second layer provided on the outermost layer 66 side (the vehicle exterior side) of the first layer.

The first layer is a layer having the same material and the same characteristics as the material and the characteristics of the outermost layer 66. The second layer is a layer having the same material and the same characteristics as the material and the characteristics of the antireflection layer included in the intermediate layer 64. In this example, the hue adjustment layer includes two layers of the first layer and the second layer. However, not only this, but a plurality of layers of a stacked body of the first layer and the second layer may be stacked. The hue adjustment layer is preferably a layer in which the first layer and the second layer are alternately stacked by 2*n* (n is a natural number of 1 or more) layers from the base material 60 side.

However, the configuration of the hue adjustment layer is not limited to the configuration including the first layer having the same material as the material of the outermost layer 66 and the second layer having the same material as the material of the antireflection layer and may be any configuration.

(Second Functional Film)

The second functional film 68 provided on the surface 60*b* on the vehicle interior side of the base material 60 is a layer that transmits far-infrared rays. The second functional film 68 may have the same configuration as the configuration of the intermediate layer 64. That is, for example, the transmissive member 20 may be laminated in the order of the base material 60 and the antireflection layer from the base material 60 toward the vehicle interior side. For example, in the transmissive member 20, the base material 60, the antireflection layer, and the hue adjustment layer (the first layer and the second layer) may be stacked in this order from the base material 60 toward the vehicle interior side.

(Adhesive Film)

A not-illustrated adhesion layer may be formed between the intermediate layer 64 and the base material 60. The adhesive film is a film that causes the base material 60 and the intermediate layer 64 to adhere, in other words, a film that improves an adhesive force between the base material 60 and the intermediate layer 64.

The adhesive film is a film capable of transmitting far-infrared rays. The material of the adhesive film is optional but preferably contains at least one kind of a material selected out of a group of Si, Ge, MgO, $NiO_x$, $CuO_x$, ZnS, $Al_2O_3$, $ZrO_2$, $SiO_2$, $TiO_2$, ZnO, and $Bi_2O_3$ and more preferably contains $ZrO_2$.

(Characteristics of the Transmissive Member)

Characteristics of the transmissive member 20 are explained. Although the material, the thickness, and the laminated structure of the transmissive member 20 are explained above, the material, the thickness, and the laminated structure of the transmissive member 20 are not limited to the above explanation and may be any material, any thickness, and any laminated structure that satisfy the characteristics explained below.

(Internal Transmittance of the Transmissive Member)

The transmissive member 20 is capable of transmitting far-infrared rays. In the transmissive member 20, an internal transmittance for light (far-infrared rays) having a wavelength of 10 μm is preferably 50% or more, more preferably 60% or more, and still more preferably 70% or more. In the transmissive member 20, an average internal transmittance for light (far-infrared rays) having a wavelength of 8 μm to 13 μm is 50% or more, preferably 60% or more, and more preferably 70% or more. Since the internal transmittance of the transmissive member 20 at 10 μm and the average internal transmittance of the transmissive member 20 at 8 μm to 13 μm fall within these numerical value ranges, it is possible to appropriately transmit far-infrared rays and sufficiently exert, for example, the performance of the far-infrared camera CA1. Note that, here, the average internal transmittance is an average value of internal transmittances for light having respective wavelengths in the wavelength band (here, 8 μm to 13 μm).

The internal transmittance of the transmissive member 20 is a transmittance excluding surface reflection losses on an incident side and an emission side and is well known in the technical field and measurement of the internal transmittance may be a method that is usually performed. The measurement is performed, for example, as explained below.

A pair of flat samples (a first sample and a second sample) that are made of base materials having the same composition and have different thicknesses is prepared. Both surfaces of the flat samples are planes that are parallel to each other and are optically polished. When an external transmittance including a surface reflection loss of the first sample is represented as T1, an external transmittance including a surface reflection loss of the second sample is represented as T2, the thickness of the first sample is represented as Td1 (mm), and the thickness of the second sample is represented as Td2 (mm), where Td1<Td2, an internal transmittance τ at thickness Tdx (mm) can be calculated by the following Expression (1).

$$\tau = \exp\left[-Tdx \times (\ln T1 - \ln T2)/\Delta Td\right] \quad (1)$$

(External Transmittance of the Transmissive Member)

In the transmissive member 20, an external transmittance for light (far-infrared rays) having a wavelength of 10 μm is preferably 55% or more, more preferably 62% or more, and still more preferably 73% or more. In the transmissive member 20, an average external transmittance for light (far-infrared rays) having a wavelength of 8 μm to 13 μm is preferably 57% or more, more preferably 64% or more, and still more preferably 75% or more. Since the external transmittance of the transmissive member 20 at 10 μm and the average external transmittance of the transmissive member 20 at 8 μm to 13 μm fall within these numerical value ranges, it is possible to appropriately transmit far-infrared rays and sufficiently exert, for example, the performance of the far-infrared camera CA1. Note that, as explained above, the external transmittance indicates transmittance including surface reflection losses on the incident side and the emission side. The average external transmittance here is an average value of external transmittances for light having respective wavelengths in the wavelength band (here, 8 μm to 13 μm).

Note that the external transmittance of an infrared ray can be measured by, for example, a Fourier transform infrared spectrometer (manufactured by ThermoScientific Inc.; product name: Nicolet iS10).

(Reflectance of the Transmissive Member)

In the transmissive member 20, the reflectance of light having 10 μm is preferably 15% or less, more preferably 10% or less, and still more preferably 5% or less. In the transmissive member 20, the average reflectance for light having a wavelength of 8 μm to 12 μm is preferably 15% or less, more preferably 10% or less, and still more preferably 5% or less. Since the reflectance and the average reflectance are in these ranges, it is possible to appropriately exert the function of an infrared transmitting member. Note that the average reflectance is an average value of reflectance for light having respective wavelengths in the wavelength band (here, 8 μm to 12 μm). The reflectance can be measured by, for example, a Fourier transform infrared spectrometer (Nicolet iS10 manufactured by ThermoScientific Inc.).

(Fracture Velocity of the Transmissive Member by a Chart Stone Chipping Test)

Here, fracture velocity (km/h) measured on the surface 20*a* on the vehicle exterior side of the transmissive member 20 in the chart stone chipping test explained below is represented as fracture velocity Sa (km/h) and fracture velocity (km/h) measured on the surface (the surface 12A in this example) on the vehicle exterior side of the glass member 10 in the chart stone chipping test is represented as fracture velocity Sb (km/h).

In this case, a ratio Sa/Sb of the fracture velocity Sa to the fracture velocity Sb is preferably 0.7 or more, more preferably 0.9 or more, and still more preferably 1.0 or more. The ratio Sa/Sb is preferably 0.7 or more, more preferably 0.9 or more, and still more preferably 1.0 or more. Since the ratio Sa/Sb is in this range, the shock resistance of the transmissive member 20 is sufficiently secured to the shock resistance of the glass member 10 and sufficient shock resistance can be imparted to the vehicle glass 1. On the other hand, when Sa/Sb is 1.1 or less, the difference between the shock resistance of the transmissive member 20 and the shock resistance of the glass member 10 is not too large, which is preferable in that well-balanced shock resistance can be imparted.

A difference value Sa-Sb (km/h) obtained by subtracting the fracture velocity Sb from the fracture velocity Sa is preferably −6 km/h or more, more preferably −2 km/h or more, and still more preferably 0.5 km/h or more. The difference value Sa-Sb is preferably −6 km/h or more, more preferably −2 km/h or more, and still more preferably 0.5 km/h or more.

Since the difference value Sa-Sb falls within this range, sufficient shock resistance can be imparted to the vehicle glass 1.

(Chart Stone Chipping Test)

The chart stone chipping test is explained below. The present inventor has found that the shock resistance of the vehicle glass 1 such as resistance to flying stones can be appropriately evaluated by a chart stone chipping test specified below. Note that the chart stone chipping test specified below can be applied to evaluation of shock resistance of not only the vehicle glass 1 according to the present embodiment but also any vehicle glass.

Figure 7:
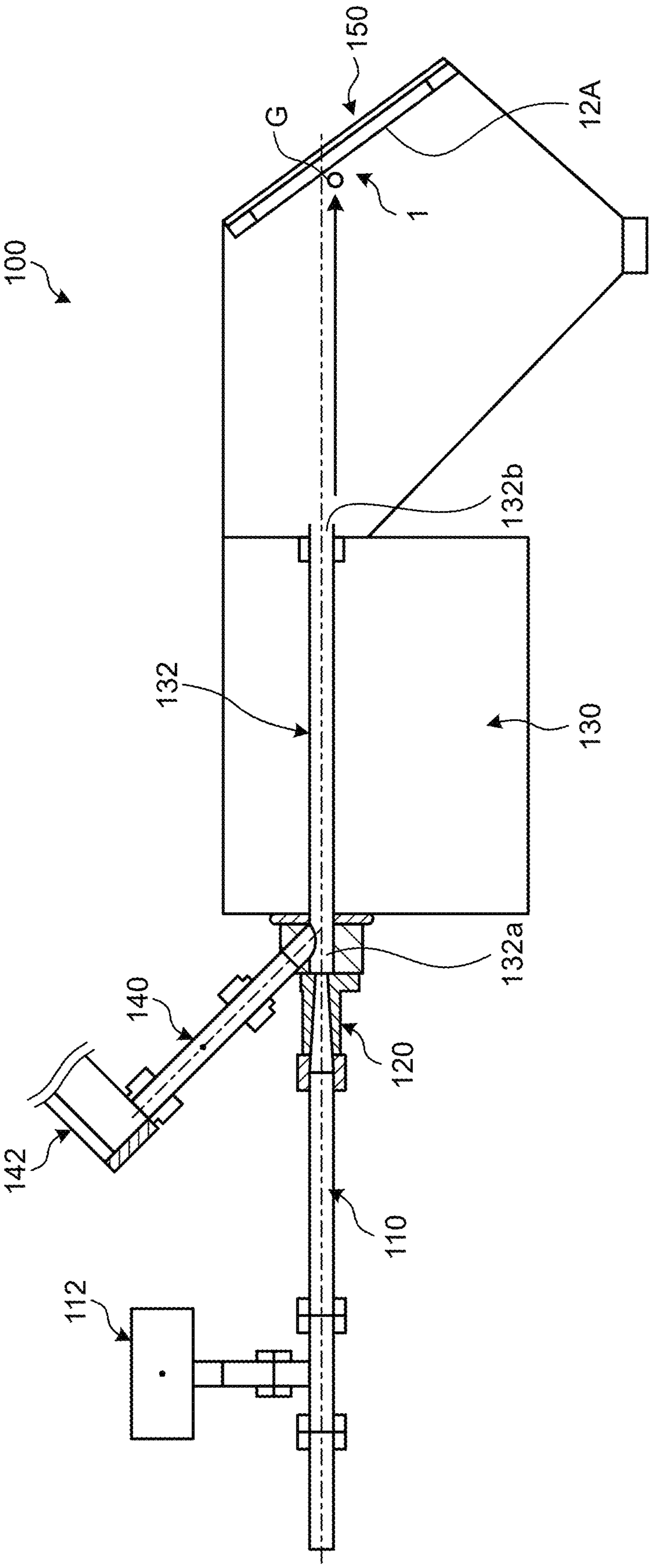
FIG. 7 is a schematic view for explaining a chart stone chipping test.

FIG. 7 is a schematic diagram illustrating the chart stone chipping test. The configuration of a testing machine 100 for performing the chart stone chipping test conforms to the Multi-impact tester specified in ISO-20567. However, the testing machine 100 is different from the Multi-impact tester of ISO-20567 in that a chart stone G explained below is discharged toward a test body (here, the vehicle glass 1). An overview of the configuration of the testing machine 100 is explained below.

As illustrated in FIG. 7, the testing machine 100 includes a connecting pipe 110, an air acceleration nozzle 120, a flange 130, a chart stone supply pipe 140, and a test body holding unit 150.

The connecting pipe 110 is a member corresponding to the "connecting pipe 2" in ISO-20567-1:2017 and is a pipe having length of 190 mm±1 mm and an inner diameter of 19 mm±0.2 mm. A pressure measuring instrument 112 corresponding to the "pressure gauge 1" in ISO-20567-1:2017 is connected to the connecting pipe 110.

The air acceleration nozzle 120 is a nozzle, a proximal end portion of which is connected to the distal end of the connecting pipe 110 and an inner diameter of which decreases toward the distal end portion. The air acceleration nozzle 120 is a nozzle corresponding to the "air-accelerating nozzle 3" in ISO-20567-1:2017 and has length of 80 mm±1 mm, an inner diameter of a proximal end portion of 19 mm±0.2 mm, and an inner diameter of the distal end portion of 7 mm±0.2 mm.

The flange 130 is a member in which a chart stone acceleration pipe 132 is provided and corresponds to the "flange and grit-accelerating pipe 4" in ISO-20567-1:2017. The chart stone acceleration pipe 132 has an overall length of 352 mm±1 mm and an inner diameter of 30 mm±0.2 mm. In the chart stone acceleration pipe 132, a proximal end portion 132*a* is connected to the distal end portion of the air acceleration nozzle 120 and a distal end portion 132*b* is opened.

The chart stone supply pipe 140 is a pipe, the distal end portion of which is connected between the proximal end portion 132*a* and the distal end portion 132*b* of the chart stone acceleration pipe 132. The chart stone supply pipe 140 corresponds to the "grit feed pipe 5" in ISO-20567-1:2017 and has an overall length of 205 mm±3 mm and an inner diameter of 19 mm±1 mm. An angle formed by the center axis of the chart stone supply pipe 140 and the center axis of the chart stone acceleration pipe 132 is 45°±1° and the distal end portion of the chart stone supply pipe 140 is present at a position 35 mm±1 mm away from the distal end portion of the air acceleration nozzle 120. A chart stone G casting tank 142 in which a chart stone G is stored and from which the chart stone G is cast into the chart stone supply pipe 140 may be connected to the proximal end portion of the chart stone supply pipe 140.

The test body holding unit 150 is a member that holds the test body (the vehicle glass 1 in the present embodiment) and has the functions of the "jet of grit 6" and the "aperture 7" in ISO-20567-1:2017. That is, the test body holding unit 150 holds the test body such that a test position of the surface of the test body (the surface on the vehicle exterior side of the vehicle glass 1 in the present embodiment) faces the distal end portion 132*b* of the chart stone acceleration pipe 132, the distance from the test position of the surface of the test body to the distal end portion 132*b* of the chart stone acceleration pipe 132 is 290 mm±1 mm, and an angle formed by the surface of the test body and the center axis of the chart stone acceleration pipe 132 is 54°±1°. The test body holding unit 150 holds the test body in a state in which openings of Φ40 mm are respectively formed on the front surface (the surface facing the distal end portion 132*b*) and the rear surface (the surface opposite to the side facing the distal end portion 132*b*) of the test body.

As the chart stone G used in the chart stone chipping test, a chart stone having a diameter of 4.75 mm or more and 9.5 mm or less when converted into a sphere is used. As the chart stone G, a chart stone having a $SiO_2$ content of 90% or more and 100% or less is used and the other components may be optional. As the chart stone G, it is preferable to use a chart stone having weight of 0.2 g or more and 1.8 g or less.

In the chart stone chipping test, in a state in which the test body (the vehicle glass 1 in the present embodiment) is held by the test body holding unit 150, while a plurality of chart stones G are supplied from the chart stone supply pipe 140 to the chart stone acceleration pipe 132, air having a predetermined pressure is discharged from the distal end portion of the air acceleration nozzle 120 to the chart stone acceleration pipe 132 to accelerate the chart stone G in the chart stone acceleration pipe 132 and discharge the chart stone G from the distal end portion 132*b*. The test body is installed in a form in which a peripheral portion thereof is fixed to an opening of the test body holding unit 150 in which an opening of, for example, Φ40 mm is formed. The chart stone G discharged from the distal end portion 132_b_ collides with the surface of the test body held by the test body holding unit 150 (the surface on the vehicle exterior side of the vehicle glass 1 in the present embodiment).

More specifically, in the chart stone chipping test, the pressure of the air supplied to the chart stone acceleration pipe 132 is set to 0.1 MPa and 200 g of the chart stone G is discharged from the distal end portion 132_b_ such that 200 g in total of the chart stone G is discharged in 10 seconds±1 second. Then, after 200 g of the chart stone G is discharged, it is checked whether cracks have occurred on the surface of the test body (the surface on the vehicle exterior side of the vehicle glass 1 in the present embodiment). When no crack has occurred, the pressure of the air supplied to the chart stone acceleration pipe 132 is raised by 0.02 MPa at a time and the same test is repeated until cracks occur.

Note that, in the chart stone chipping test, when a crack length starting from a part where the chart stone G collided is 5 mm or more, it is determined that cracks have occurred. Note that the crack length here indicates length from one end to the other end of a crack having a maximum length from one end to the other end of connected cracks among the cracks that have occurred.

In the chart stone chipping test, fracture velocity S (km/h) indicating discharge velocity of the chart stone G is calculated by the following Expression (2) based on pressure P (MPa) of the air supplied to the chart stone acceleration pipe 132 immediately before it is determined that the cracks have occurred.

$$S = -327.4 \times P^2 + 223.98 \times P \quad (2)$$

As explained above, it can be said that the fracture velocity S is an indicator corresponding to the discharge velocity of the chart stone G at the time when the cracks have occurred and indicating the level of an impact force by the chart stone G. Therefore, it is seen that the shock resistance of the test body is higher as the fracture velocity S is higher. It is possible to appropriately evaluate the shock resistance of the test body by using the chart stone chipping test. Further, since the shock resistance against a flying stone can be highly accurately evaluated by using the chart stone G, the chart stone G is particularly suitable for the evaluation of the shock resistance of the vehicle glass 1.

The fracture velocity Sb of the vehicle glass 1 in the present embodiment indicates the fracture velocity S at the time when the chart stone chipping test explained above is performed in a state in which the vehicle glass 1 is held such that the surface (the surface 12A in the present embodiment) on the vehicle exterior side of the glass member 10 in the surface on the vehicle exterior side of the vehicle glass 1 overlaps a test position facing the distal end portion 132_b_ of the chart stone acceleration pipe 132. That is, it can be said that the fracture velocity S at the time when the chart stone chipping test is performed under the conditions explained above and cracks occur on the surface on the vehicle exterior side of the glass member 10 is the fracture velocity Sb.

Similarly, the fracture velocity Sa of the vehicle glass 1 in the present embodiment indicates the fracture velocity S at the time when the chart stone chipping test explained above is performed in a state in which the vehicle glass 1 is held such that the surface 20_a_ of the transmissive member 20 in the surface on the vehicle exterior side of the vehicle glass 1 overlaps the test position facing the distal end portion 132_b_ of the chart stone acceleration pipe 132. That is, it can be said that the fracture velocity S at the time when the chart stone chipping test is performed under the conditions explained above and cracks occur on the surface 20_a_ of the transmissive member 20 is the fracture velocity Sb.

(Impact Fracture Energy by a Cemented Carbide Conical Pin Impact Test I of the Transmissive Member)

Here, impact fracture energy (J) measured on the surface 20_a_ on the vehicle exterior side of the transmissive member 20 with a cemented carbide conical pin impact test I explained below is represented as impact fracture energy Ea (J) and impact fracture energy (J) measured on the surface (the surface 12A in this example) on the vehicle exterior side of the glass member 10 with the cemented carbide conical pin impact test I is represented as impact fracture energy Eb (J).

In this case, a ratio Ea/Eb of the impact fracture energy Ea to the impact fracture energy Eb is preferably 1.2 or more, more preferably 1.5 or more, and still more preferably 2.0 or more. The ratio Ea/Eb is preferably 1.2 or more, more preferably 1.5 or more, and still more preferably 2.0 or more. Since the ratio Ea/Eb is within this range, the shock resistance of the transmissive member 20 is sufficiently secured with respect to the shock resistance of the glass member 10 and sufficient shock resistance can be imparted to the vehicle glass 1.

A difference value Ea-Eb (J) obtained by subtracting the impact fracture energy Eb from the impact fracture energy Ea is preferably 0.01 J or more, more preferably 0.03 J or more, and still more preferably 0.06 J or more. The difference value Ea-Eb (J) is preferably 0.01 J or more, more preferably 0.03 J or more, and still more preferably 0.06 J or more.

Since the difference value Ea-Eb falls within this range, sufficient shock resistance can be imparted to the vehicle glass 1.

(Cemented Carbide Conical Pin Impact Test I)

The cemented carbide conical pin impact test I is explained below. The present inventor has found that the shock resistance of the vehicle glass 1 such as resistance to flying stones can be appropriately evaluated by a cemented carbide conical pin impact test I specified below. The cemented carbide conical pin impact test I specified below is applicable to evaluation of shock resistance of not only the vehicle glass 1 according to the present embodiment but also any vehicle glass. For the evaluation of the shock resistance, both the chart stone chipping test and the cemented carbide conical pin impact test I may be used or only one of the tests may be used.

Figure 8:
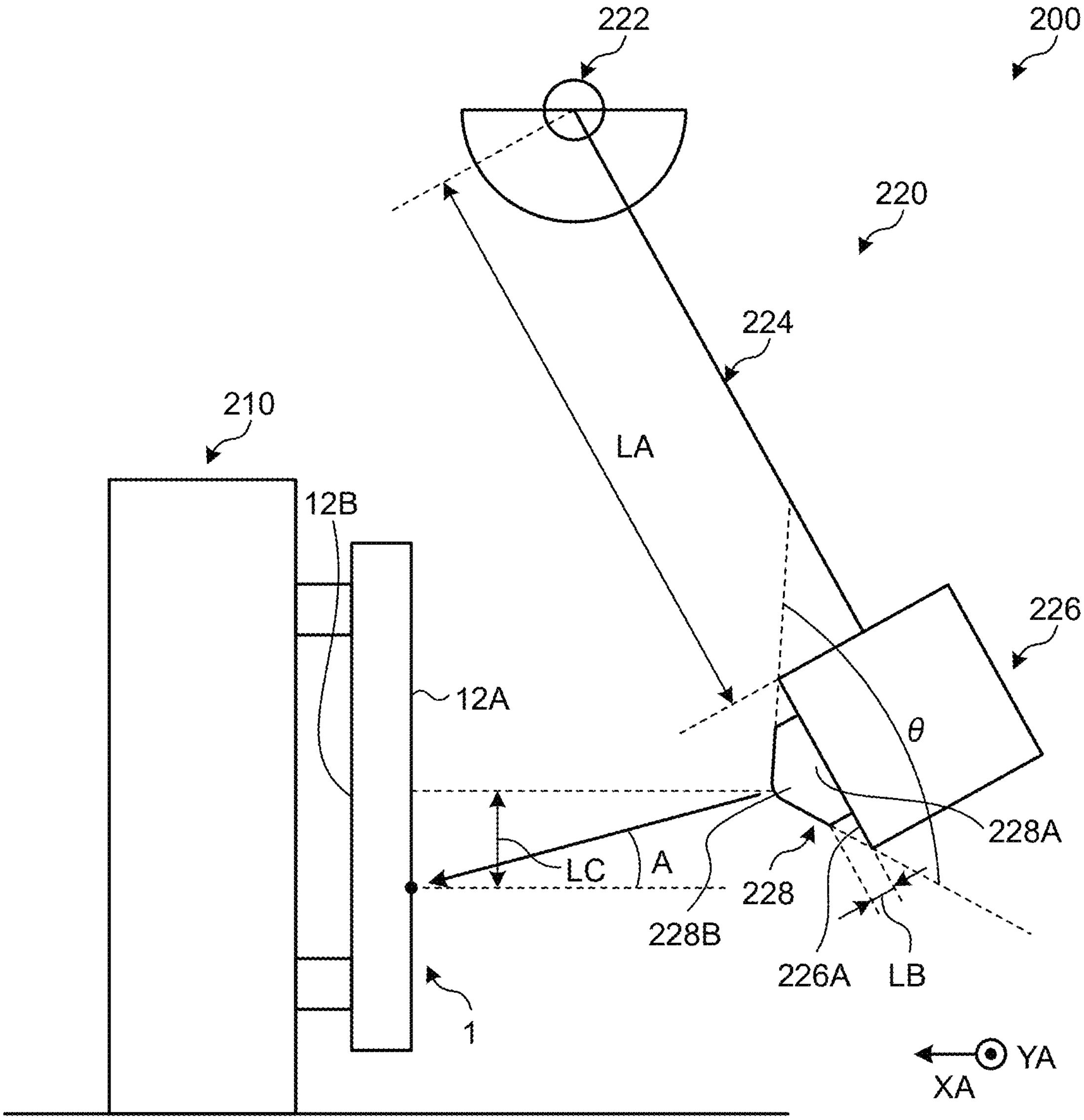
FIG. 8 is a schematic diagram for explaining a cemented carbide conical pin impact test I.

FIG. 8 is a schematic diagram illustrating the cemented carbide conical pin impact test I. As illustrated in FIG. 8, a testing machine 200 for the cemented carbide conical pin impact test I includes a test body holding unit 210 and a pendulum unit 220.

The pendulum unit 220 is a member that applies impact to a test body. The pendulum unit 220 includes a rotation center unit 222, a shaft unit 224, a weight unit 226, and a pin 228. The shaft unit 224 is a shaft-shaped member elongated in the axial direction. The shaft unit 224 has a cylindrical shape having length LA of 385 mm±1 mm in the axial direction and a diameter of 3 mm±0.1 mm. The material of the shaft unit 224 is iron. Note that the length LA here indicates the length of the shaft unit 224 from a fulcrum section that rotates centering on the rotation center unit 222 to a distal end portion to which the weight unit 226 is connected. In the shaft unit 224, the fulcrum section is rotatably connected to the rotation center unit 222 to rotate with the fulcrum section as a rotation center. The shaft unit 224 rotates with an axis extending from the fulcrum section in a direction YA as a rotation axis. The direction YA is one direction (the horizontal direction) orthogonal to the vertical direction.

The weight unit 226 is a weight provided at the distal end portion of the shaft unit 224. The weight unit 226 has a rectangular parallelepiped shape having length in the lateral direction of 28 mm±1 mm, length in the longitudinal direction of 30 mm±1 mm, and length in the height direction of 30 mm±1 mm. Here, the length in the lateral direction indicates the length of the weight unit 226 in the YA direction in a state in which the shaft unit 224 extends along the vertical direction, the length in the longitudinal direction indicates the length of the weight unit 226 in an XA direction in the state in which the shaft unit 224 extends along the vertical direction, and the length in the height direction indicates the length of the weight unit 226 in the vertical direction in the state in which the shaft unit 224 extends along the vertical direction. Note that the direction XA refers to a direction orthogonal to the vertical direction and the direction YA. The material of the weight unit 226 is iron.

The pin 228 is a member protruding from a surface 226A of the weight unit 226. The surface 226A indicates a surface on the direction XA side of the weight unit 226 in the state in which the shaft unit 224 extends along the vertical direction. The pin 228 includes a columnar section 228A protruding from the surface 226A and a distal end portion 228B protruding from the distal end of the columnar section 228A. The columnar section 228A is formed in a columnar shape having a diameter of 6 mm±0.1 mm and length LB from the surface 226A to the distal end of 4 mm±1 mm. The distal end portion 228B has a conical shape having the distal end formed in an R-shaped and protrudes from the distal end of the columnar section 228A. In the distal end portion 228B, an apex angle θ of a cone is 120°±1° and the R of the distal end is 50 μm±1 μm. The material of the pin 228 is WC (tungsten carbide).

Note that a total weight of the weight unit 226 and the pin 228 is 200 g±1 g.

The test body holding unit 210 is a member that holds the test body (the vehicle glass 1 in the present embodiment). The test body holding unit 210 holds the test body such that a test position on the surface of the test body (the surface on the vehicle exterior side of the vehicle glass 1 in the present embodiment) is in contact with the distal end of a distal end portion 228B of the pendulum unit 220 in a state in which the shaft unit 224 of the pendulum unit 220 extends along the vertical direction while the surface of the test body (the surface on the vehicle exterior side of the vehicle glass 1 in the present embodiment) extends along the vertical direction. The test body holding unit 210 holds the test body in a state in which an opening of 40 mm×40 mm is formed on the rear surface (the surface opposite to the side facing the distal end portion 132*b*) side of the test body.

In the cemented carbide conical pin impact test I, in a state in which the test body (the vehicle glass 1 in the present embodiment) is held by the test body holding unit 150, the pendulum unit 220 is held in a state in which the shaft unit 224 is rotated to the opposite side to the direction XA and, thereafter, the holding is released. Then, the pendulum unit 220 rotates to the direction XA side and the distal end portion 228B of the pin 228 collides with the surface of the test body (the surface on the vehicle exterior side of the vehicle glass 1 in the present embodiment).

More specifically, in the cemented carbide conical pin impact test I, the pendulum unit 220 is held at a position where a swing-up angle A formed by a straight line connecting the center of the pin 228 and the test position (the collision position) on the surface of the test body and a surface parallel to the ground is 5° and the holding is released. Then, after the distal end portion 228B of the pin 228 collides with the surface of the test body, it is checked whether cracks have occurred on the surface of the test body (the surface on the vehicle exterior side of the vehicle glass 1 in the present embodiment). When no crack has occurred, a position to be the test position (the collision position) of the test body is moved and the swing-up angle A is increased by 5° at a time and the same test is repeated until cracks occur.

In the cemented carbide conical pin impact test I, when a crack length starting from a part where the distal end portion 228B of the pin 228 collides is 5 mm or more, it is determined that cracks have occurred. Note that the crack length here indicates length from one end to the other end of a crack having a maximum length from one end to the other end of connected cracks among the cracks that have occurred.

In the cemented carbide conical pin impact test I, impact fracture energy E(J) is calculated by the following Expression (3) based on length LC in the vertical direction between the center of the pin 228 and the test position (the collision position) on the surface of the test body immediately before it is determined that the cracks have occurred. Note that 0.2 in Formula (3) is equivalent to the weight of the pendulum unit 220, and 9.8 is equivalent to the gravitational acceleration.

$$E = 0.2\,[\mathrm{kg}] \times LC[\mathrm{m}] \times 9.8\,[\mathrm{m/s^2}] \tag{3}$$

It can be said that the impact fracture energy E is an indicator indicating the level of the impact force by the pin 228. Therefore, it is seen that the shock resistance of the test body is higher as the impact fracture energy E is higher and it is possible to appropriately evaluate the shock resistance of the test body by using the cemented carbide conical pin impact test I. Further, since the shock resistance can be highly accurately evaluated by using the pin 228 made of WC having high hardness, the cemented carbide conical pin impact test I is particularly suitable for evaluating the shock resistance of the vehicle glass 1.

The impact fracture energy Eb of the vehicle glass 1 in the present embodiment indicates the impact fracture energy E at the time when the cemented carbide conical pin impact test I explained above is carried out in a state in which the vehicle glass 1 is held such that the surface (the surface 12A in the present embodiment) on the vehicle exterior side of the glass member 10 in the surface on the vehicle exterior side of the vehicle glass 1 overlaps the test position that collides with the distal end portion 228B of the pin 228. That is, it can be said that the impact fracture energy E at the time when the cemented carbide conical pin impact test I is carried out under the conditions explained above and cracks occur on the vehicle exterior side of the glass member 10 is the impact fracture energy Eb.

Similarly, the impact fracture energy Eb of the vehicle glass 1 in the present embodiment indicates the impact fracture energy E at the time when the cemented carbide conical pin impact test I explained above is carried out in a state in which the vehicle glass 1 is held such that the surface 20*a* of the transmissive member 20 in the surface on the vehicle exterior side of the vehicle glass 1 overlaps the test position that collides with the distal end portion 228B of the pin 228. That is, it can be said that the impact fracture energy E at the time when the cemented carbide conical pin impact test I is performed under the conditions explained above and crack occur on the surface 20*a* of the transmissive member 20 is the impact fracture energy Ea.

(Crack Occurrence Speed by a Cemented Carbide Conical Pin Impact Test II of the Transmissive Member)

Further, when a cemented carbide conical pin impact test II explained below is performed on the surface 20*a* on the vehicle exterior side of the transmissive member 20, occurrence speed at the time when cracks having a diameter of 7 mm or more occur is defined as crack occurrence speed Sc (km/h).

In this case, the crack occurrence speed Sc is preferably 25 km/h or more, more preferably 35 km/h or more, still more preferably 45 km/h or more, and particularly preferably 50 km/h or more.

Since the crack occurrence speed Sc falls within this range, sufficient shock resistance can be imparted to the vehicle glass 1.

The cemented carbide conical pin impact test II is explained below. The present inventor has found that the shock resistance of the vehicle glass 1 such as resistance to flying stones can be appropriately evaluated by the cemented carbide conical pin impact test II defined below. The cemented carbide conical pin impact test II defined below is applicable to evaluation of shock resistance of not only the vehicle glass 1 according to the present embodiment but also any vehicle glass. For the evaluation of the shock resistance, a plurality of or only one of the chart stone chipping test, the cemented carbide conical pin impact test I, and the cemented carbide conical pin impact test II may be used.

(Cemented Carbide Conical Pin Impact Test II)

Figure 9:
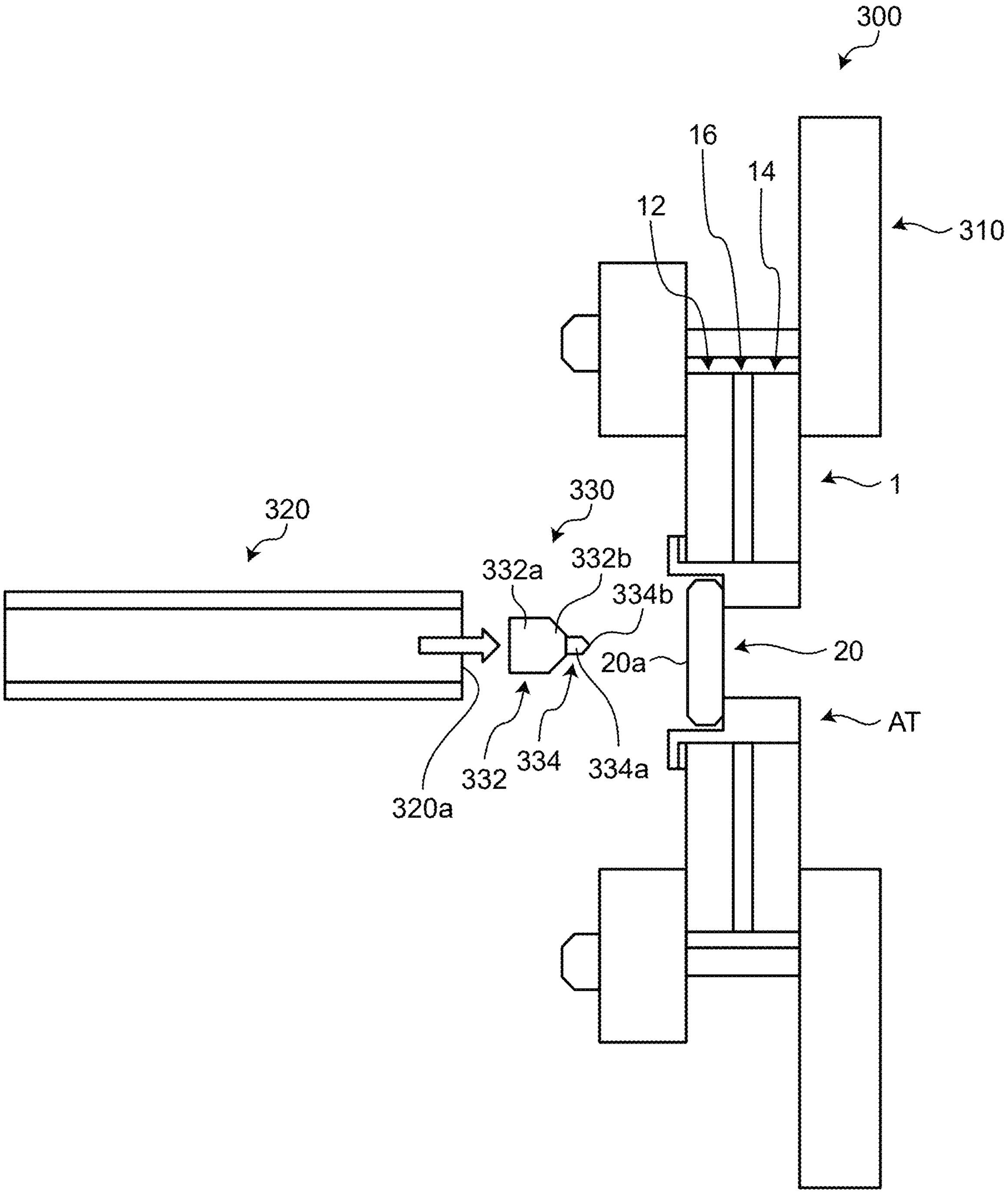
FIG. 9 is a schematic diagram illustrating a cemented carbide conical pin impact test II.

FIG. 9 is a schematic diagram illustrating the cemented carbide conical pin impact test II. As illustrated in FIG. 9, a testing machine 300 for the cemented carbide conical pin impact test II includes a test body holding unit 310, a firing unit 320, and an impactor 330.

The impactor 330 is a member that applies impact to a test body. The impactor 330 includes a base 332 and a pin 334.

The base 332 is a member made of polyethylene. The base 332 has a shape in which a truncated conical portion 332*b* protrudes from the distal end of a cylindrical portion 332*a* having a diameter of 10.8 mm±0.1 mm. The length of the portion 332*a* in the axial direction is 10 mm±0.5 mm. The diameter of the distal end of the portion 332*b* is 3 mm±0.5 mm and an apex angle of the distal end is 60° 10.

The pin 334 is a member made of tungsten carbide. The pin 334 is a member connected to the distal end of the portion 332*a* and protruding from the distal end of the portion 332*a*. The pin 334 has a shape in which the conical portion 332*b* protrudes from the distal end of a cylindrical section 334*a* having a diameter of 1.5 mm±0.1 mm. The length in the axial direction of the portion 334*a* is 3 mm±1 mm. An apex angle of a portion 334*b* is 120°±1° and R at the distal end of the portion 334*b* is 0.2 mm±0.01 mm. Note that the weight of the impactor 330 is 0.7 g±0.05 g.

The test body holding unit 310 is a member that holds the test body (the vehicle glass 1 in the present embodiment). The test body holding unit 310 is a member made of aluminum. The vehicle glass 1 was manufactured by forming a through-hole (an opening) having a diameter of 53.5 mm on the vehicle exterior side and the vehicle interior side at the center of a glass member in which PVB having thickness of 0.76 mm was disposed between soda-lime glasses having a size of 300 mm×300 mm and thickness of 2.0 mm and attaching a transmissive member-attached attachment manufactured by bonding an attachment AT and the prepared transmissive member using a urethane-based adhesive to the through-hole such that the surface on the outer side of the transmissive member and the vehicle exterior side surface of the laminated glass member were flush with each other. Note that the attachment AT is a frame member made of ABS provided at the outer peripheral edge of the transmissive member. In the attachment AT, an outer diameter of a portion inserted into the through-hole is 52.5 mm±0.5 mm, a flange section spreading to the outer side is provided on the distal end side in the axial direction (the left side in FIG. 9), and the outer diameter of the flange section is 55 mm±0.5 mm. A step for supporting the transmissive member is formed in an inner diameter portion of the attachment AT and an inner diameter of a region on the distal end side in the axial direction (a region further on the left side of the step in FIG. 9 into which the transmissive member is inserted) is larger than an inner diameter of a region further on the opposite side than the region (a region further on the right side than the step). The inner diameter of the region on the distal end side in the axial direction is 51 mm±0.5 mm and the inner diameter of the region on the opposite side is 47 mm±0.5 mm. The attachment AT (the transmissive member-attached attachment) and the vehicle glass 1 (the glass member) are fixed by a double-sided tape. Specifically, the rear surface of the flange section of the attachment AT and a main surface of the vehicle glass are fixed by the double-sided tape. The test body holding unit 310 holds the test body such that a test position on the surface of the test body (the surface 20*a* of the transmissive member 20 of the vehicle glass 1 in the present embodiment) is exposed to a side from which the impactor 330 is fired. The test body holding unit 310 supports the outer peripheral edge in the surface of the test body and holds the test body to expose the inner side than a supported region of the test body.

The firing unit 320 is a cylindrical member having an inner diameter of 11 mm±0.1 mm and fires the impactor 330 housed on the inside when pressure is applied to the inside pressure to the inside. Specifically, the firing unit 320 is disposed such that a firing port 320*a* through which the impactor 330 is fired faces the test position of the test body. The firing unit 320 fires the impactor 330 from the firing port 320*a*. The distal end of the portion 334*b* of the fired impactor 330 collides with the test location of the test body.

Note that a firing condition of the impactor 330 is extrusion by compressed air. For example, in a state in which the impactor 330 is held on the inside of the firing unit 320, the inside of the firing unit 320 is pressurized to a pressure of 0.02 MPa or more and 0.1 MPa or less and, thereafter, the holding of the impactor 330 is released to fire the impactor 330.

In the cemented carbide conical pin impact test II, when the impactor 330 is brought into collision with the surface 20*a* of the transmissive member 20 under the conditions explained above, occurrence speed at the time when cracks having a diameter of 7 mm or more occur is measured by an inter-two point distance speed meter and is set as crack occurrence speed Sc (km/h).

(Other Characteristics of the Transmissive Member)

Other characteristics of the transmissive member 20 are explained below.

In the transmissive member 20, indentation hardness of the surface 20*a* on the vehicle exterior side (that is, the surface 66*a* of the outermost layer 66) in an indentation depth range of 90 nm or more and 110 nm or less is preferably 9.0 GPa or more, more preferably 10.0 GPa or more, still more preferably 11.0 GPa or more, particularly preferably 12.0 GPa or more, and most preferably 13.0 GPa or more. Since the indentation hardness of the surface 20*a* falls within this range, it is possible to appropriately improve the scratch resistance.

The indentation hardness of the surface 20*a* indicates indentation hardness in a range of indentation depth of 90 nm or more and 110 nm or less measured by a nanoindentation method (a continuous stiffness measurement method) using a nanoindenter. More specifically, the indentation hardness is a value calculated from a displacement-load curve from loading to unloading of a measurement indenter and is specified in ISO 14577.

The indentation hardness can be measured as explained below. Specifically, using an iMicro nanoindenter manufactured by KLA Corporation, an indentation depth h (nm) corresponding to an indentation load P (mN) is continuously measured over an entire process from a start of loading to unloading at a measurement site and a P-h curve is created. Then, from the created P-h curve, indentation hardness H (GPa) is calculated as indicated by the following Expression (4).

$$H = P/A \tag{4}$$

In Equation (4), P represents an indentation load (mN) and A represents a projection area ($\mu m^2$) of the indenter.

In the present embodiment, the indentation hardness H in a section where the indentation depth is 90 nm or more and 110 nm or less is represented as indentation hardness of the front surface 20*a*. That is, in the present embodiment, it can be said that it is preferable that the indentation hardness H satisfies the range explained above in all sections having an indentation depth of 90 nm or more and 110 nm or less.

As illustrated in FIG. 3, in the transmissive member 20, it is preferable that the surface 20*a* on the vehicle exterior side is formed to be flush (continuous) with the surface on the vehicle exterior side of the light blocking region A2. In other words, the front surface 20*a* on the vehicle exterior side of the transmissive member 20 is attached to be continuous with the surface 12A of the glass substrate 12. Since the surface 20*a* of the transmissive member 20 is continuous with the surface 12A of the glass substrate 12 as explained above, it is possible to prevent a wiping effect of a wiper from being impaired. It is possible to suppress likelihood that designability of the vehicle V is impaired because of the presence of the step and dust and the like deposit in the step. Further, it is preferable that the transmissive member 20 is molded according to a curved surface shape of the applied vehicle glass 1. Although method for molding the transmissive member 20 is not particularly limited, polishing or molding is selected according to the curved surface shape or the member.

The shape of the transmissive member 20 is not particularly limited but is preferably a plate-like shape adjusted to the shape of the opening 19. That is, for example, when the opening 19 is circular, the transmissive member 20 preferably has a disk shape (a columnar shape). From the viewpoint of designability, the surface shape of the transmissive member 20 on the vehicle exterior side may be processed to match the curvature of the outer surface shape of the glass substrate 12. Further, the transmissive member 20 may be formed in a lens shape for the reason of, for example, achieving both widening of a viewing angle of the far-infrared camera CA1 and improvement of mechanical characteristics. Such a configuration is preferable because far-infrared rays can be efficiently condensed even if the area of the transmissive member 20 is small. In this case, the number of the lens-shaped transmissive members 20 is preferably one to three and typically preferably two. Further, it is particularly preferable that the lens-shaped transmissive member 20 is aligned in advance and modularized and is integrated with a housing or a bracket for bonding the far-infrared camera CA1 to the vehicle glass 1.

In the vehicle glass 1 of the present embodiment, as illustrated in FIG. 3, it is preferable that a configuration is adopted in which the area of the opening 19 on the surface on the vehicle exterior side is smaller than the area of the opening 19 on the surface on the vehicle interior side and, according to the configuration, the shape of the transmissive member 20 is formed such that the area on the surface on the vehicle exterior side is smaller than the area on the surface on the vehicle interior side. With such a configuration, when the glass substrate 12 (the vehicle exterior side) and the glass substrate 14 (the vehicle interior side) are formed into a laminated glass structure together with the interlayer film, it is possible to properly dispose the transmissive member 20 even when there are machining errors in the position and shape of a glass opening.

The area of the opening 19 on the surface on the vehicle exterior side is preferably 700 $mm^2$ or more and 8700 $mm^2$ or less, more preferably 1500 $mm^2$ or more and 5400 $mm^2$ or less, and still more preferably 2200 $mm^2$ or more and 3100 $mm^2$ or less. The area of the transmissive member 20 on the surface on the vehicle exterior side may be the same as the area of the opening 19 on the surface on the vehicle exterior side. The area of the opening 19 on the surface on the vehicle interior side is preferably 900 $mm^2$ or more and 9000 $mm^2$ or less, more preferably 1700 $mm^2$ or more and 5900 $mm^2$ or less, and still more preferably 2500 $mm^2$ or more and 3500 $mm^2$ or less. The area of the surface of the transmissive member 20 on the vehicle interior side may be the same as the area of the opening 19 on the surface on the vehicle interior side. Since the area of the opening 19 falls within such a range, it is possible to more suitably improve the strength against impact from the vehicle exterior side.

Note that, as illustrated in FIG. 4, a configuration may be adopted in which the area of the opening 19 on the surface on the vehicle exterior side is larger than the area of the opening 19 on the surface on the vehicle interior side and, according to the configuration, the shape of the transmissive member 20 may be formed such that the area on the surface on the vehicle interior side is smaller than the area on the surface on the vehicle exterior side. In the opening 19 and the transmissive member 20, the area on the surface on the vehicle interior side and the area on the surface on the vehicle exterior side may be the same.

As illustrated in FIG. 3, in the transmissive member 20, length D1 of a longest straight line among straight lines connecting any two points in the surface on the vehicle exterior side is preferably 30 mm or more and 100 mm or less, more preferably 40 mm or more and 80 mm or less, and still more preferably 55 mm or more and 60 mm or less. As illustrated in FIG. 3, in the opening 19 of the far-infrared ray transmitting region B, length D2 of a longest straight line among straight lines connecting any two points in the surface on the vehicle exterior side is preferably 33 mm or more and 105 mm or less, more preferably 43 mm or more and 83 mm or less, and still more preferably 58 mm or more and 63 mm or less. It can also be said that the length D2 is the length of the longest straight line among straight lines connecting any two points on the outer periphery of the opening 19 on the surface (the surface 12A) on the vehicle exterior side of the vehicle glass 1. By setting the length D1 of the transmissive member 20 and the length D2 of the opening 19 within these ranges, it is possible to suppress deterioration in the strength of the vehicle glass 1 and also suppress an amount of perspective distortion around the opening 19. Note that the lengths D1 and D2 are lengths corresponding to the diameter of the surface on the vehicle exterior side when the shape of the surface on the vehicle exterior side of the transmissive member 20 is circular. The lengths D1 and D2 here indicate lengths in a state in which the vehicle glass 1 is mounted on the vehicle V. For example, when glass is bent into a shape to be mounted on the vehicle V, the lengths D1 and D2 are lengths in a state after the bending. The same applies to explanation of dimensions and positions other than the lengths D1 and D2 unless particularly explained.

(Modifications)

Subsequently, a modification is explained. The vehicle glass 1 according to the modification is different from the embodiment in that the vehicle glass 1 includes a cover unit 30, a protective member 40, a camera attachment unit 50, and a sound absorbing material 52 in addition to the glass member 10 and the transmissive member 20. Note that, in the present modification, the vehicle glass 1 includes all of the cover unit 30, the protective member 40, the camera attachment unit 50, and the sound absorbing material 52. However, the vehicle glass 1 may include at least one of the cover unit 30, the protective member 40, the camera attachment unit 50, and the sound absorbing material 52.

Figure 10:
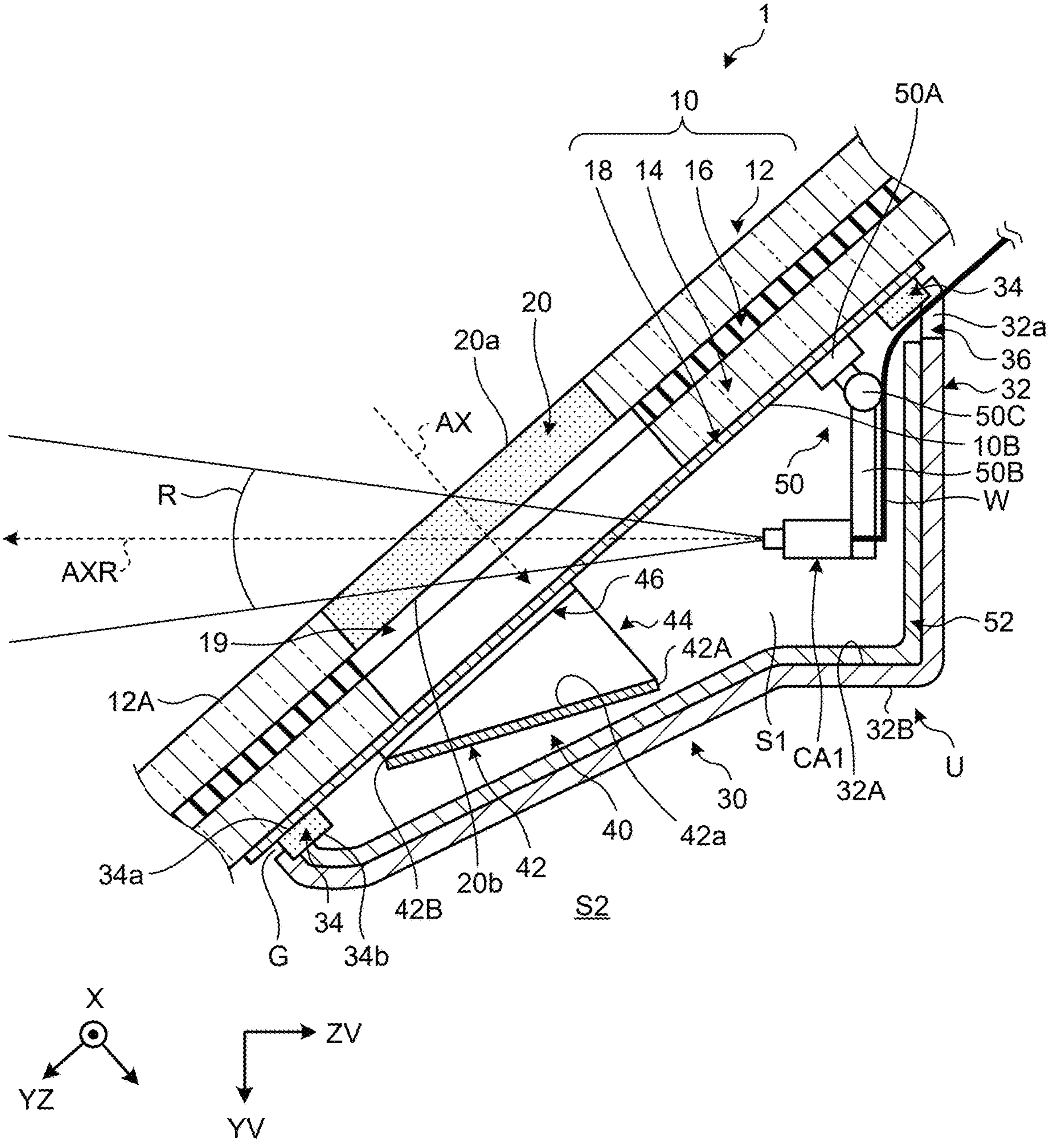
FIG. 10 is a schematic sectional view of a vehicle glass according to a modification.

FIG. 10 is a schematic sectional view of a vehicle glass according to the modification. As illustrated in FIG. 10, the vehicle glass 1 according to the modification may include the cover unit 30, the protective member 40, the camera attachment unit 50, and the sound absorbing material 52 in addition to the glass member 10 and the transmissive member 20. Note that the far-infrared camera CA1 may be treated as being included in the vehicle glass 1 or may be treated as a separate body from the vehicle glass 1. For example, the far-infrared camera CA1 and the vehicle glass 1 may configure the camera unit 1A attached to the vehicle glass 1 (the glass member 10).

(Attachment Position of the Glass Member)

As illustrated in FIG. 10, the glass member 10 is attached to the vehicle V to be inclined with respect to the vertical direction. Therefore, when a direction along the downward direction in the vertical direction is represented as a direction YV, the direction Y of the glass member 10 in a state of being attached to the vehicle V is inclined with respect to the direction YV and the surface 20*a* on the vehicle exterior side of the transmissive member 20 is also inclined with respect to the direction YV. When the horizontal direction that is a direction from the front to the rear of the vehicle V is represented a direction ZV, the direction Z of the glass member 10 in a state of being attached to the vehicle V is inclined with respect to the direction ZV and a perpendicular line AX orthogonal to the surface 20*a* of the transmissive member 20 is also inclined with respect to the direction ZV. However, the glass member 10 is not limited to being attached to the vehicle V to be inclined with respect to the vertical direction. For example, the direction Y of the glass member 10 and the surface 20*a* of the transmissive member 20 in a state of being attached to the vehicle V may extend along the direction YV and the direction Z and the perpendicular line AX of the glass member 10 in a state of being attached to the vehicle V may extend along the direction ZV. Note that, in the following explanation, unless noted otherwise, a state in which the glass member 10 is attached to the vehicle V is explained.

(Attachment Position of the Far-Infrared Camera)

The far-infrared camera CA1 is provided in the vehicle V. The far-infrared camera CA1 is provided further on the vehicle interior side than the transmissive member 20 of the vehicle glass 1, that is, further on the direction ZV side (the direction Z side) than the transmissive member 20. The far-infrared camera CA1 is provided such that an optical axis AXR passes through the transmissive member 20. Furthermore, the far-infrared camera CA1 is provided such that a detection range R passes through the transmissive member 20. The detection range R indicates a range (an imaging range) that can be detected by the far-infrared camera CA1. It can be said that the far-infrared camera CA1 receives and detects far-infrared rays made incident through the detection range R. Note that it can be said that the detection range R is a space that expands centering on the optical axis AXR at a predetermined viewing angle as being further separated from the far-infrared camera CA1. The size and the viewing angle of the detection range R may be set as appropriate according to a distance and a range desired to be detected by the far-infrared camera.

In the present modification, in the far-infrared camera CA1, the optical axis AXR is inclined with respect to the perpendicular line AX of the transmissive member 20. That is, the optical axis AXR of the far-infrared camera CA1 does not extend along the surface 20*a* of the transmissive member 20 and is not orthogonal to the surface 20*a* of the transmissive member 20. For example, an angle formed by the optical axis AXR and the direction ZV may be smaller than an angle formed by the perpendicular line AX of the transmissive member 20 and the direction ZV. However, a relation between the optical axis AXR and the perpendicular line AX is not limited to this. For example, the far-infrared camera CA1 may be provided such that the optical axis AXR extends along the perpendicular line AX of the transmissive member 20.

(Cover Unit)

The cover unit 30 is a cover that is provided in the vehicle V and covers a surface 20*b* on the vehicle interior side of the transmissive member 20. The cover unit 30 is attached to a surface 10B on the vehicle interior side of the glass member 10 to cover the surface 20*b* of the transmissive member 20. Here, a space in the vehicle covered by the cover unit 30 (a space in the cover unit 30) is represented as a first space S1. It can also be said that the first space S1 is a space surrounded by the inner surface of the cover unit 30 (an inner surface 32A of a housing 32 explained below in the present modification), the surface 10B on the vehicle interior side of the glass member 10, and the surface 20*b* on the vehicle interior side of the transmissive member 20. It can be said that the surface 20*b* of the transmissive member 20 is included in the first space S1. In the present modification, the protective member 40, the camera attachment unit 50, the far-infrared camera CA1 fixed to the camera attachment unit 50, and the sound absorbing material 52 are provided in the first space S1.

The cover unit 30 blocks the first space S1 from a second space S2 (a space other than the first space S1 on the vehicle interior side) not covered by the cover unit 30 in the space inside the vehicle. Here, blocking indicates that the cover unit 30 covers the first space Si without a gap. For example, when air is supplied to the first space Si such that the air pressure in the first space Si is higher than the air pressure in the second space S2 by 1 atm, it may be determined that, when the pressure difference between the first space Si and the second space S2 is 0.9 atm or more, the cover unit 30 blocks the first space S1 and the second space S2.

Since the cover unit 30 blocks the first space S1, it is possible to appropriately suppress sound leakage to the vehicle interior side caused by the opening 19 being formed in the glass member 10.

(Housing)

In the present modification, the cover unit 30 preferably includes a housing 32 and a fixing section 34. The housing 32 is a cover that covers the first space S1. The housing 32 is opened on one surface side and is attached to the glass member 10 such that the opened side faces the surface 10B on the vehicle interior side of the glass member 10.

In the present modification, in the housing 32, an outlet port 32*a* that is an opening for allowing a wire W of the far-infrared camera CA1 to pass is formed. The outlet port 32*a* is an opening penetrating the housing 32 from an inner surface 32A to an outer surface 32B of the housing 32. The wire W extends from the far-infrared camera CA1 in the first space S1 to the outside of the first space S1 (the inside of the second space S2) through the outlet port 32*a*. In an example illustrated in FIG. 10, the outlet port 32*a* is formed in the vicinity of the outer peripheral edge on the opening side of the housing 32, but the position where the outlet port 32*a* is formed may be optional. In addition, the outlet port 32*a* is not an essential component. For example, when the wiring is not provided in the far-infrared camera CA1, the outlet port 32*a* may not be formed.

The housing 32 may be made of any material, but may be, for example, a resin member that does not transmit visible light. This can prevent the far-infrared camera CA1 or the like from being visually recognized by an occupant or the like of the vehicle V.

(Fixing Section)

Figure 11:
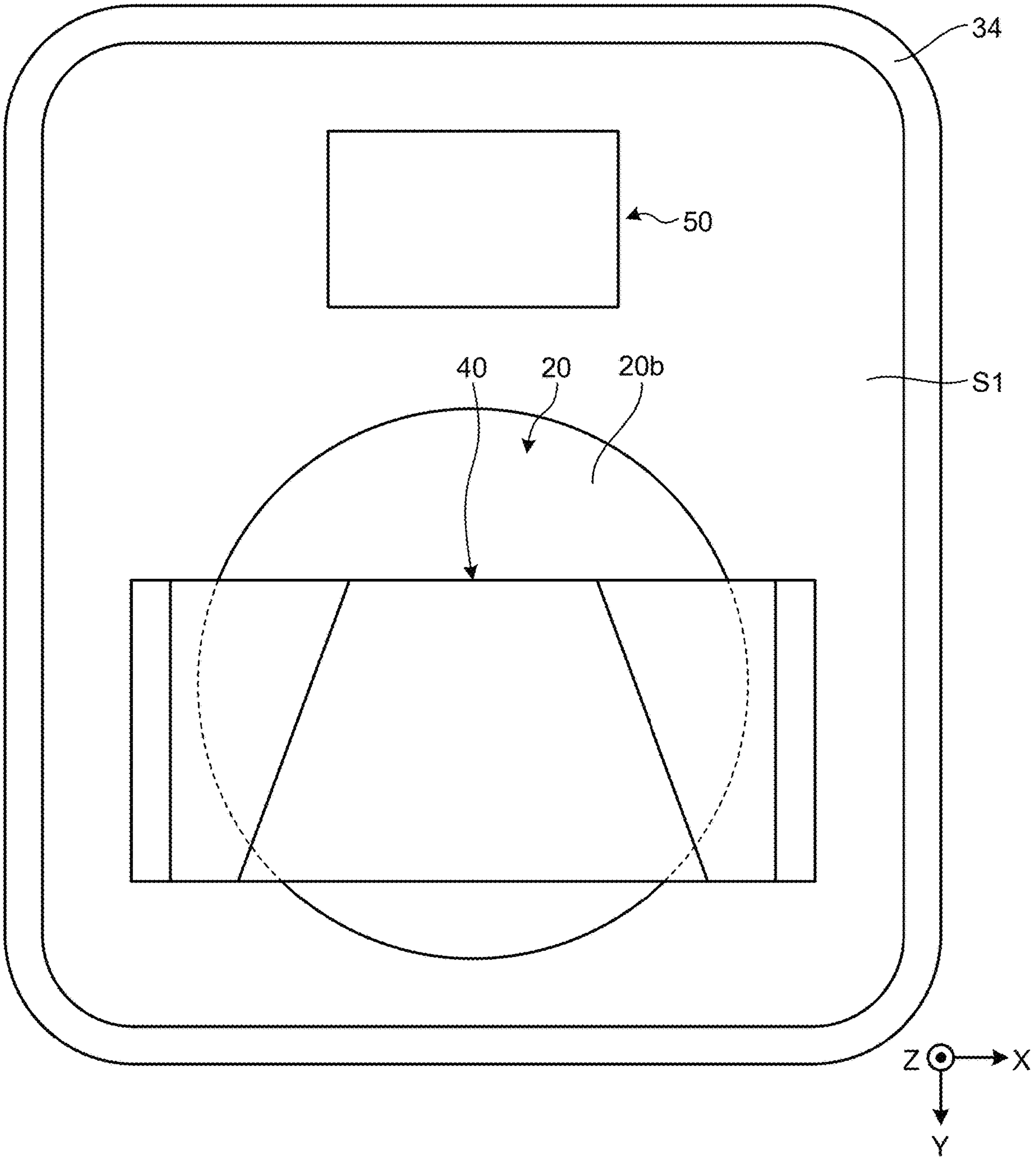
FIG. 11 is a schematic diagram of a first space viewed from a Z direction.

FIG. 11 is a schematic diagram of the first space when viewed from the Z direction. The fixing section 34 is a member that fixes the housing 32 to the surface 10B of the glass member 10. As illustrated in FIG. 11, the fixing section 34 is a frame-shaped member surrounding the outer periphery of the first space Si (the surface 20*b* of the transmissive member 20) when viewed from the Z direction. The fixing section 34 preferably has a shape that extends without interruption over the entire section of the outer periphery of the first space S1 (the surface 20*b* of the transmissive member 20) when viewed from the Z direction.

As illustrated in FIG. 10, the fixing section 34 closes a gap G formed between the surface 10B of the glass member 10 and the outer peripheral edge of the housing 32. In the example illustrated in FIG. 10, the fixing section 34 is located between the glass member 10 and the housing 32 in the Z direction to close the gap G. The fixing section 34 is fixed while a surface 34*a* on the vehicle exterior side (the side opposite to the Z direction) is in contact with the surface 10B of the glass member 10. A surface 34*b* on the vehicle interior side (the Z direction side) of the fixing section 34 is fixed while being in contact with the outer peripheral edge of the housing 32. However, the shape of the fixing section 34 is not limited to this and may be any shape that closes the gap G between the glass member 10 and the housing 32. For example, the fixing section 34 may be provided to surround the outer peripheral edge of the housing 32 when viewed from the Z direction to close the gap G.

The material of the fixing section 34 may be optional and may be, for example, rubber or may be an adhesive.

When the outlet port 32*a* is formed in the cover unit 30, it is preferable that a closing section 36 that closes the outlet port 32*a* is further provided. Since the wire W passes through the outlet port 32*a*, the closing section 36 is provided to close a region other than a region occupied by the wire W in the outlet port 32*a*. The material of the closing section 36 is optional and may be, for example, rubber or may be an adhesive.

Note that not only the far-infrared camera CA1 but also the visible light camera CA2 and other devices may be housed in the cover unit 30.

Further, a heater or the like may be provided in the cover unit 30 in order to prevent fogging of the surfaces on the vehicle interior side of the glass member 10 and the transmissive member 20 and impart a snow melting function.

(Protective Member)

Figure 12:
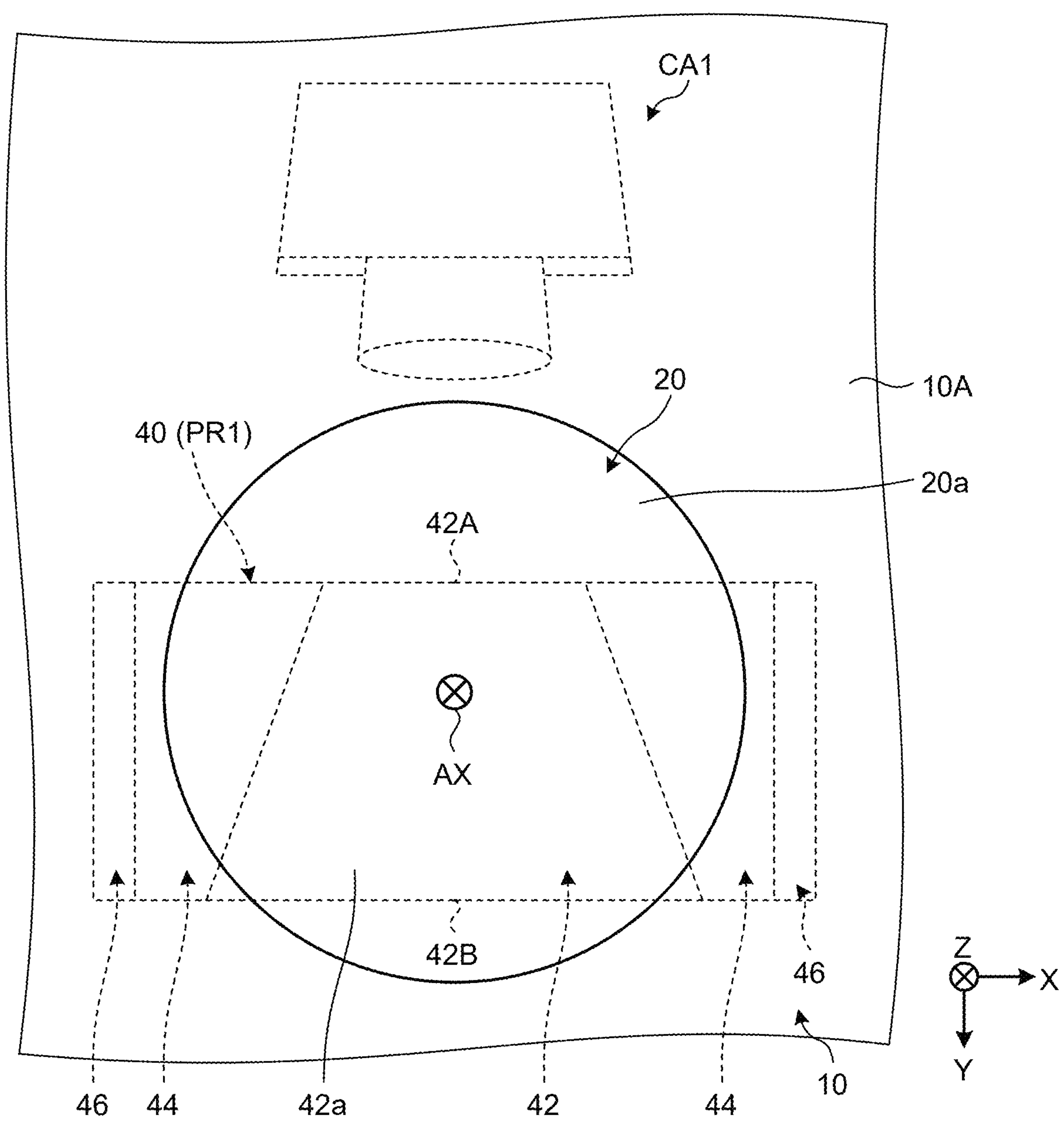
FIG. 12 is a schematic diagram of the transmissive member viewed in a perpendicular direction from the vehicle exterior side.

FIG. 12 is a schematic diagram in the case in which the transmissive member is viewed in the perpendicular direction from the vehicle exterior side. As illustrated in FIG. 10, the protective member 40 is provided in the first space S1. The protective member 40 is provided further on the vehicle interior side (the direction ZV side) than the transmissive member 20. As illustrated in FIG. 12, the protective member 40 overlaps at least a part of the transmissive member 20 when viewed from a direction along the perpendicular line AX (a direction orthogonal to the surface 20*a* of the transmissive member 20). In other words, at least a part of the protective member 40 and at least a part of the transmissive member 20 overlap each other when viewed from the direction along the perpendicular line AX. Accordingly, even if a collision object penetrates the transmissive member 20, it is possible to receive the collision object with the protective member 40 and prevent the collision object from reaching the driver's seat side. As illustrated in FIG. 10, in the present modification, the protective member 40 is preferably provided further on the vehicle exterior side (the side opposite to the direction ZV) than the far-infrared camera CA1 and provided at a position not overlapping the detection range R of the far-infrared camera CA1. That is, the protective member 40 is preferably located on the outside of the detection range R without interfering with the detection range R. Accordingly, a far-infrared ray mad incident on the far-infrared camera CA1 is prevented from being blocked by the protective member 40. It is possible to suppress deterioration in detection accuracy of the far-infrared ray.

More specifically, the protective member 40 includes a surface section 42, a protruding section 44, and a fixing section 46. As illustrated in FIG. 12, the surface section 42 is provided at a position overlapping at least a part of the transmissive member 20 when viewed from a direction along the perpendicular line AX. The surface section 42 preferably overlaps a region having an area of 30% or more of the entire region of the transmissive member 20 when viewed from the direction along the perpendicular line AX. In other words, when a region overlapping the surface section 42 in the entire region of the transmissive member 20 when viewed from the direction along the perpendicular line AX is represented as an overlapping region, the area of the overlapping region is preferably 30% or more with respect to the area of the entire region of the transmissive member 20. When the area of the overlapping region is 30% or more with respect to the entire area of the transmissive member 20, collision energy can be sufficiently absorbed by the protective member even when the collision object penetrates the transmissive member 20. The area of the overlapping region is more preferably 35% or more and still more preferably 40% or more with respect to the area of the entire region of the transmissive member 20. On the other hand, the area of the overlapping region is preferably less than 90% with respect to the area of the entire region of the transmissive member 20. When the area of the overlapping region is less than 90% of the entire area of the transmissive member 20, it is unlikely that the protective member 40 interferes with the detection range R. The area of the overlapping region is more preferably 85% or less and still more preferably 80% or less with respect to the area of the entire region of the transmissive member 20. Since the area of the overlapping region falls within this range, it is possible to suitably prevent a collision object penetrating the transmissive member 20 from reaching the driver's seat. Note that the protective member 40 may be applied with meshing or punching for the purpose of weight reduction or the like, in other words, an opening may be formed in the surface section 42 of the protective member 40. When an opening is formed in the surface section 42 of the protective member 40, the area of the opening is also included in the area of the overlapping region of the protective member 40. In other words, in the entire region of the transmissive member 20, a region (in other words, in the entire region of the transmissive member 20, a region overlapping the region surrounded by the peripheral edge of the protective member 40) obtained by combining a region overlapping a portion where the opening of the surface section 42 is not formed and a region overlapping a portion where the opening of the surface section 42 is formed is set as the overlapping region. Note that when openings are formed in the surface section 42 of the protective member 40, the areas of the openings are preferably ϕ10 mm or less in terms of diameter. When the area of the opening is ϕ10 mm or less, it is unlikely that the function of the protective member is impaired even when a flying stone or the like collides with the transmissive member 20. The area of the opening is preferably Φ8 mm or less and more preferably ϕ5 mm or less. Note that, for example, the area being ϕ10 mm or less in terms of diameter indicates that the area is equal to or less than the area of a circle having a diameter of 10 mm.

The surface section 42 is provided at a position not overlapping the detection range R of the far-infrared camera CA1. In the present modification, the surface section 42 is located further on the direction YV side (the lower side in the vertical direction) than the detection range R. In other words, it can be said that the surface section 42 is located below the far-infrared camera CA1 in the vertical direction. That is, in the present modification, it can be said that the surface section 42 is located further on the direction YV side (the lower side in the vertical direction) and the vehicle exterior side (the side opposite to the direction ZV) than the far-infrared camera CA1.

The surface section 42 is a plate-like member and extends from an end portion 42B to an end portion 42A. The surface section 42 has a planar shape in the present modification. The end portion 42B is an end portion on the direction ZV side (the vehicle exterior side) of the surface section 42. The end portion 42A is an end portion on the opposite side to the direction ZV (the vehicle interior side) of the surface section 42. It can be said that the end portion 42B is an end portion on a far side from the far-infrared camera CA1 of the surface section 42 and the end portion 42A is an end portion on a close side to the far-infrared camera CA1 of the surface section 42. However, the shape of the surface section 42 may be optional and may be, for example, a curved surface shape or may not be a plate shape.

The material of the protective member 40 is optional. However, the protective member 40 is preferably made of a material having higher breaking strength than the transmissive member 20. The protective member 40 is preferably made of a material having higher breaking strength than the cover unit 30. Examples of the material of the protective member 40 include stainless steel, an aluminum alloy, a copper alloy, and fiber-reinforced resin. Examples of the fiber-reinforced resin include glass-reinforced polycarbonate. Note that the breaking strength may be, for example, when a tensile strength test is performed according to JIS Z2241, a value obtained by dividing a load at the time when a test piece is broken by a minimum sectional area of a broken portion.

(Camera Attachment Unit)

As illustrated in FIG. 10, the camera attachment unit 50 is provided in the first space S1. The camera attachment unit 50 is a mechanism for fixing the far-infrared camera CA1 to the surface 10B on the vehicle interior side of the glass member 10. The camera attachment unit 50 includes a base 50A, an extending section 50B, and an adjustment section 50C. The base 50A is a member fixed to the surface 10B. The extending section 50B is a member that extends from the base 50A and fixes the far-infrared camera CA1. The adjustment section 50C is a mechanism that is provided in the extending section 50B and adjusts the position of the extending section 50B with respect to the base 50A. For example, the adjustment section 50C changes the direction of the extending section 50B with respect to the base 50A to adjust the position of the extending section 50B with respect to the base 50A. However, the configuration of the camera attachment unit 50 is not limited to the configuration explained above and may be any configuration for fixing the far-infrared camera CA1 to the glass member 10. The camera attachment unit 50 is not an essential component.

(Sound Absorbing Material)

The sound absorbing material 52 is a member that is provided in the first space S1 and absorbs at least a part of a sound wave. By providing the sound absorbing material 52, it is possible to appropriately suppress sound leakage to the vehicle interior side.

It is preferable that the sound absorbing material 52 is not provided between the transmissive member 20 and the far-infrared camera CA1 in the direction along the optical axis AXR and is provided at a part other than a part between the transmissive member 20 and the far-infrared camera CA1. In the example illustrated in FIG. 10, the sound absorbing material 52 is provided on the inner surface of the cover unit 30 (the inner surface 32A of the housing 32). However, a position where the sound absorbing material 52 is provided may be optional.

The material of the sound absorbing material 52 may be optional but may be, for example, at least one of urethane foam, polyethylene foam, melamine foam, synthetic rubber sponge, glass wool, felt, and nonwoven fabric. By using these materials as the material of the sound absorbing material 52, it is possible to more appropriately suppress sound leakage to the vehicle interior side. Among these materials, a soft urethane foam material is preferable when scattering of materials in construction and ease of machining are considered. Crosslinked polyethylene foam with high moisture resistance is also preferable.

Note that, although the sound absorbing material 52 is not an essential component, in the case of use, it is preferable to attach the sound absorbing material 52 to the housing 32 so as to cover the first space S1. It is preferable to dispose the sound absorbing material 52 at a position where the sound absorbing material 52 does not hinder disposition of the protective member 40, the camera attachment unit 50, and the far-infrared camera CA1 image acquisition of the far-infrared camera CA1.

(Effects)

As explained above, the vehicle glass 1 according to a first aspect of the present disclosure includes the glass member 10 in which the opening 19 penetrating the glass member 10 from the surface on the vehicle exterior side to the surface on the vehicle interior side is formed and the transmissive member 20 that is disposed in the opening 19, and has an average internal transmittance of 50% or more for light having a wavelength of 8 μm to 13 μm. In the vehicle glass 1, the ratio Sa/Sb of the fracture velocity Sa [km/h] measured on the surface 20*a* on the vehicle exterior side of the transmissive member 20 by the chart stone chipping test to the fracture velocity Sb [km/h] measured on the surface on the vehicle exterior side of the glass member 10 is 0.7 or more. According to the present disclosure, it is possible to appropriately transmit far-infrared rays and appropriately secure shock resistance.

The vehicle glass 1 according to a second aspect of the present disclosure is the vehicle glass 1 according to the first aspect, in which the ratio Ea/Eb of the impact fracture energy Ea [J] measured on the surface 20*a* on the vehicle exterior side of the transmissive member 20 by the cemented carbide conical pin impact test and the impact fracture energy Eb [J] measured on the surface on the vehicle exterior side of the glass member 10 is preferably 1.2 or more. According to the present disclosure, it is possible to appropriately transmit far-infrared rays and appropriately secure shock resistance.

The vehicle glass 1 according to a third aspect of the present disclosure is the vehicle glass 1 according to the first aspect or the second aspect, in which the crack occurrence speed Sc [km/h] measured on the surface 20*a* on the vehicle exterior side of the transmissive member 20 by the cemented carbide conical pin impact test is preferably 25 or more. According to the present disclosure, it is possible to appropriately transmit far-infrared rays and appropriately secure shock resistance.

The vehicle glass 1 according to a fourth aspect of the present disclosure is the vehicle glass 1 according to any one of the first to third aspects, in which the transmissive member 20 preferably includes the base material 60 made of at least one kind selected out of a group consisting of Si, Ge, ZnS, and chalcogenide glass. By using such a base material 60, it is possible to appropriately transmit far-infrared rays and appropriately secure shock resistance.

The vehicle glass 1 according to a fifth aspect of the present disclosure is the vehicle glass 1 according to the fourth aspect, in which the base material 60 is preferably made of Si. By using the base material 60 made of Si, it is possible to appropriately transmit far-infrared rays and appropriately secure shock resistance.

The vehicle glass 1 according to a sixth aspect of the present disclosure is the vehicle glass 1 according to the fourth aspect or the fifth aspect, in which the transmissive member 20 preferably includes the first functional film 62 on the surface 60*a* on the vehicle exterior side of the base material 60. By using the transmissive member 20 including the first functional film 62, it is possible to appropriately transmit far-infrared rays and appropriately secure shock resistance.

The vehicle glass 1 according to a seventh aspect of the present disclosure is the vehicle glass 1 according to the sixth aspect, in which the outermost layer 66 on the vehicle exterior side of the first functional film 62 is preferably a layer containing $ZrO_2$ as a main component. By providing the outermost layer 66 containing $ZrO_2$ as the main component, it is possible to appropriately transmit far-infrared rays and appropriately secure shock resistance.

The vehicle glass 1 according to an eighth aspect of the present disclosure is the vehicle glass 1 according to any one of the fourth to seventh aspects, in which the thickness W1 of the base material 60 is preferably 1 mm or more and 5 mm or less. By providing the base material 60 having such thickness, it is possible to appropriately transmit far-infrared rays and appropriately secure shock resistance.

The vehicle glass 1 according to a ninth aspect of the present disclosure is the vehicle glass 1 according to any one of the first to eighth aspects, in which the length D1 of a longest straight line among straight lines connecting any two points in a surface on the vehicle exterior side of the opening 19 is preferably 30 mm or more and 105 mm or less. By setting the length D1 within this range, it is possible suppress strength deterioration in the vehicle glass 1 and also suppress an amount of perspective distortion around the opening 19.

The vehicle glass 1 according to a tenth aspect of the present disclosure is the vehicle glass 1 according to any one of the first to ninth aspects, preferably further including the protective member 40 that is provided further on the vehicle interior side than the transmissive member 20 and overlaps at least a part of the transmissive member 20 when viewed from a direction orthogonal to the surface on the vehicle exterior side of the transmissive member 20. By providing the protective member 40, even if a collision object penetrates the transmissive member 20, it is possible to receive the collision object with the protective member 40 and prevent the collision object from reaching the driver's seat side.

The vehicle glass 1 according to an eleventh aspect of the present disclosure is the vehicle glass 1 according to any one of the first to tenth aspects, in which a frame member is preferably provided at the outer peripheral edge of the transmissive member 20 and the transmissive member 20 is preferably attached to the opening 19 via the frame member. By being attached to the opening 19 via the frame member, the transmissive member 20 can be appropriately held in the opening 19.

The vehicle glass 1 according to a twelfth aspect of the present disclosure is the vehicle glass 1 according to any one of the first to eleventh aspects, in which the area of the opening 19 on the surface on the vehicle exterior side of the glass member 10 is preferably smaller than the area of the opening 19 on the surface on the vehicle interior side of the glass member 10. Accordingly, it is possible to improve the strength against impact from the vehicle exterior side.

The vehicle glass 1 according to a thirteenth aspect of the present disclosure is the vehicle glass 1 according to any one of the first to twelfth aspects, in which the area of the opening 19 on the surface on the vehicle exterior side of the glass member 10 is preferably 700 $mm^2$ or more and 8700 $mm^2$ or less, and the area of the opening 19 on the surface on the vehicle interior side of the glass member 10 is preferably 900 $mm^2$ or more and 9000 $mm^2$ or less. Accordingly, it is possible to suitably improve the strength against impact from the vehicle exterior side.

EXAMPLES

Subsequently, examples are explained. Table 1 is a table illustrating vehicle glasses in the examples.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Member in opening | Material | Absent (glass member) | Transmissive made of Si member A | Transmissive made of Si member A | Transmissive made of Ge member B | Transmissive made of ZnS member C | Soda lime glass | Borosilicate glass | Chalcogenide glass 2.0 mm thick | Chalcogenide glass 4.5 mm thick |
| | First functional film | Absent | Absent | Present | Absent | Absent | Absent | Absent | Absent | Absent |
| | Average internal transmittance [%] @8 to 13 μm | 0.0 | 77.5 | 77.5 | 99.3 | 95.3 | 0.0 | 0.0 | 94.4 | 88.1 |
| | Average external transmittance [%] @8 to 13 μm | 0.0 | 41.0 | 67.7 | 46.9 | 72.5 | 0.0 | 0.0 | 63.6 | 59.4 |
| | Fracture energy Ea [J] | 0.060 | 0.166 | 0.128 | 0.073 | 0.073 | 0.129 | 0.163 | — | — |
| Fracture energy of glass member Eb [J] | | 0.060 | 0.060 | 0.060 | 0.060 | 0.060 | 0.060 | 0.060 | — | — |
| Ea-Eb [J] | | 0.000 | 0.106 | 0.068 | 0.013 | 0.013 | 0.069 | 0.103 | — | — |
| Ea/Eb | | 1.000 | 2.767 | 2.133 | 1.217 | 1.217 | 2.150 | 2.717 | — | — |
| Member in opening | Fracture velocity Sa [km/h] | 24.9 | 24.0 | 26.2 | | 19.1 | 26.6 | 24.9 | 19.1 | 26.6 |
| Fracture velocity of glass member Sb [km/h] | | 24.9 | 24.9 | 24.9 | 24.9 | 24.9 | 24.9 | 24.9 | 24.9 | 24.9 |
| Sa-Sb [km/h] | | 0.00 | −0.90 | 1.30 | −24.90 | −5.80 | 1.70 | 0.00 | −5.80 | 1.70 |
| Sa/Sb | | 1.000 | 0.964 | 1.052 | 0.000 | 0.767 | 1.068 | 1.000 | 0.767 | 1.068 |
| Evaluation | | B | A | A | A | A | B | B | A | A |

Example 1

A glass member in which PVB having thickness of 0.76 mm was disposed between soda-lime glasses having a size of 300 mm×300 mm and thickness of 2.0 mm was prepared to obtain a vehicle glass. In an example 1, no opening was formed in the glass member and no transmissive member was disposed in the opening.

Example 2

As a transmissive member, Si (an FZ grade (manufactured by an FZ method)) having a diameter of 50 mm and thickness of 2.0 mm±0.05 mm was prepared. Note that the thickness was measured with a digital caliper (CD-15CX manufactured by Mitutoyo Corporation).

A through-hole (an opening) having diameters of 53.5 mm on the vehicle exterior side and the vehicle interior side was formed at the center of the same glass member as the glass member in the example 1.

Then, a transmissive member-attached attachment manufactured by bonding an attachment and the prepared transmissive member using a urethane-based adhesive was attached to the through-hole such that the surface on the outer side of the transmissive member and the vehicle exterior side surface of a laminated glass member were flush with each other, and the vehicle glass of an example 2 was obtained. Note that the attachment is a frame member made of ABS provided at the outer peripheral edge of the transmissive member.

Example 3

As a transmissive member, four layers in total of a $NiO_x$ film (thickness 1050 nm), a $ZrO_2$ film (thickness 25 nm), a $NiO_x$ film (thickness 15 nm), and a $ZrO_2$ film (thickness 200 nm) were alternately stacked in this order from a base material side by a post-oxidation sputtering method using a load lock type sputtering apparatus (RAS-1100BII, manufactured by SYN CORPORATION) on the surface on the vehicle exterior side of the transmissive member (the base material) made of Si in the example 2 to be the $NiO_x$ film (thickness 1050 nm)/the $ZrO_2$ film (thickness 25 nm)/the $NiO_x$ film (thickness 15 nm)/the $ZrO_2$ film (thickness 200 nm), and a transmissive member having a first functional film formed on the base material made of Si was obtained. At this time, film formation conditions for the $NiO_x$ film and the $ZrO_2$ film were as follows.

($NiO_x$ film formation conditions)
Target: NiO (70 mass %)+Ni (30 mass %) mixed target
Sputtering gas: Ar gas (flow rate: 150 sccm)
Input power: 6 kW
Reactive gas: Ar (flow rate 70 sccm)+$O_2$ (flow rate: 10 sccm)
RF power: 2 kW
Substrate temperature: room temperature
Film formation pressure: 0.20 Pa
($ZrO_2$ film formation conditions)
Target: Zr target
Sputtering gas: Ar gas (flow rate: 150 sccm)
Input power: 6 kW Reactive gas: $O_2$ (flow rate: 100 sccm)
RF power: 4 kW
Substrate temperature: room temperature
Film formation pressure: 0.21 Pa Then, the obtained transmissive member was attached to a glass member in which the same opening as the opening in the example 2 was formed in the same manner as the method in the example 2 and a vehicle glass in an example 3 was obtained.

Example 4

A vehicle glass in an example 4 was obtained by the same method as the method in the example 2 except that Ge (Single crystal, manufactured by I R System Co., Ltd.) having a diameter of 50 mm and thickness of 2.0 mm±0.05 mm was used as the transmissive member.

Example 5

A vehicle glass in an example 5 was obtained by the same method as the method in the example 2 except that ZnS (Multispectral ZnS, manufactured by A·K Corporation, refractive index at 9 μm: 2.2129) having a diameter of 50 mm and thickness of 2.0 mm±0.05 mm was used as the transmissive member.

Example 6

A vehicle glass in an example 6 was obtained by the same method as the method in the example 2 except that soda lime glass (manufactured by AGC Inc.) having a diameter of 50 mm and thickness of 1.8 mm was used as the transmissive member.

Example 7

A vehicle glass in an example 7 was obtained by the same method as the method in the example 2 except that borosilicate glass (Borofloat 33, manufactured by Schott AG) having a diameter of 50 mm and thickness of 2.0 mm was used as the transmissive member.

Example 8

A vehicle glass in an example 8 was obtained by the same method as the method in the example 2 except that chalcogenide glass (IRG203, $Ge_{20}Se_{65}Sb_{15}$, manufactured by SHINKAKO CO., LTD.) having a diameter of 50 mm and thickness of 2.0 mm was used as a transmissive member.

Example 9

A vehicle glass in an example 9 was obtained by the same method as the method in the example 2 except that chalcogenide glass (IRG203, $Ge_{20}Se_{65}Sb_{15}$, manufactured by SHINKAKO CO., LTD.) having a diameter of 50 mm and thickness of 4.5 mm was used as a transmissive member.

Example 10

A vehicle glass in an example 10 was obtained by the same method as the method in the example 2 except that soda lime glass (manufactured by AGC Inc.) having a diameter of 50 mm and thickness of 2.0 mm was used as the transmissive member.

(Measurement of Transmittance)

An average internal transmittance for light (far-infrared rays) having a wavelength of 8 μm to 13 μm and an average external transmittance for light (far-infrared rays) having a wavelength of 8 μm to 13 μm at the centers of the vehicle glasses in the examples were measured. As a method of measuring the average internal transmittance and the average external transmittance, the method explained in the present embodiment was used. Respective measurement results in the examples 1 to 9 are illustrated in Table 1. Note that, in the example 1, since a through-hole was not formed at the center, the measurement result is a measurement result of the glass member itself.

(Measurement of Impact Fracture Energy by the Cemented Carbide Conical Pin Impact Test I)

For the vehicle glasses in the examples, the impact fracture energy Ea in the transmissive members (the centers of the vehicle glasses) and the impact fracture energy Eb in the glass members were measured by the cemented carbide conical pin impact test I explained in the present embodiment and the difference value Ea-Eb and the ratio Ea/Eb were calculated. Respective measurement results in the examples 1 to 7 are illustrated in Table 1. Note that, in the example 1, since a through-hole was not formed at the center, as the impact fracture energy Ea, the same value as the impact fracture energy Eb in the glass member was used.

(Measurement of Fracture Velocity by the Chart Stone Chipping Test)

For the vehicle glasses in the examples, the fracture velocity Sa in the transmissive members (the centers of the vehicle glasses) and the fracture velocity Sb in the glass members were measured by the chart stone chipping test explained in the present embodiment and the difference value Sa-Sb and the ratio Sa/Sb were calculated. Respective measurement results in the examples 1 to 9 are illustrated in Table 1. Note that, in the example 1, since a through-hole was not formed at the center, as the fracture velocity Sa, the same value as the fracture velocity Sb in the glass member was used.

As illustrated in Table 1, the vehicle glasses in the examples 2 to 5, 8, and 9, which are examples in which the average internal transmittance is 50% or more and the ratio Sa/Sb is 0.7 or more, are evaluated as A. It is seen that far-infrared rays can be appropriately transmitted and shock resistance can be appropriately imparted. On the other hand, the vehicle glasses in the examples 1, 6, and 7, which are the comparative examples that do not satisfy at least one of the conditions that the average internal transmittance is 50% or more and the condition that the ratio Sa/Sb is 0.7 or more, are evaluated as B. It is seen that not both of appropriate transmission of far-infrared rays and appropriate imparting of shock resistance can be achieved. More specifically, in the examples 1, 6, and 7, it is seen that the average internal transmittance is low and far-infrared rays cannot be appropriately transmitted.

(Measurement of Crack Occurrence Speed by the Cemented Carbide Conical Pin Impact Test II)

For the vehicle glasses in the examples, the crack occurrence speed Sc in the transmissive members (the centers of the vehicle glasses) was measured by the cemented carbide conical pin impact test II explained in the present embodiment. Respective measurement results in the examples 1 to 5 and 8 to 10 are illustrated in Table 2. Note that, in the example 1, since a through-hole was not formed at the center, as the crack occurrence speed Sc, the same value as the crack occurrence speed Sc in the glass member was used.

As illustrated in Table 2, the vehicle glasses in the examples 2 to 5, 8, and 9 in which the average internal transmittance is 50% or more and the ratio Sa/Sb is 0.7 or more can appropriately transmit far-infrared rays and, in addition, the crack occurrence speed Sc by the cemented carbide conical pin impact test II is as high as 25 [km/h] or more, which is evaluated as A, and it is seen that the vehicle glasses have excellent shock resistance.

TABLE 2

| | | Example 1 | Example 2 | Example 3 | Example 4 | Example 5 | Example 8 | Example 9 | Example 10 |
|---|---|---|---|---|---|---|---|---|---|
| Member in opening | Material | Absent (glass member) | Transmissive member A made of Si | Transmissive member A made of Si | Transmissive member B made of Ge | Transmissive member C made of ZnS | Chalcogenide glass 2.0 mm thick | Chalcogenide glass 4.5 mm thick | Soda lime glass 2.0 mm thick |
| | First functional film | Absent | Absent | Present | Absent | Absent | Absent | Absent | Absent |
| Crack occurrence speed Sc [km/h] | | 44.2 | 50.6 | 52.8 | 33.7 | 33.3 | 27.6 | 68.1 | 53.4 |
| Evaluation | | B | A | A | A | A | A | A | B |

Although the embodiment of the present invention is explained above, the embodiment is not limited by the content of the embodiment. The constituent elements explained above include those that can be easily assumed by those skilled in the art, those that are substantially the same, and those in a so-called scope of equivalents. Further, the constituent elements explained above can be combined as appropriate. Furthermore, various omissions, substitutions, or changes of the constituent elements can be made without departing from the gist of the embodiment explained above.

REFERENCE SIGNS LIST

1 VEHICLE GLASS
10 GLASS MEMBER
12, 14 GLASS SUBSTRATE
20 TRANSMISSIVE MEMBER
60 BASE MATERIAL
62 FIRST FUNCTIONAL FILM (FUNCTIONAL FILM)
64 INTERMEDIATE LAYER
66 OUTERMOST LAYER
68 SECOND FUNCTIONAL FILM

The invention claimed is:

1. A vehicle glass, comprising:

a glass member having an opening penetrating from a surface on a vehicle exterior side to a surface on a vehicle interior side; and a transmissive member disposed in the opening of the glass member and having an average internal transmittance of 50% or more for light having a wavelength in a range of 8 μm to 13 μm, wherein a ratio Sa/Sb of fracture velocity Sa in km/h measured on a surface on the vehicle exterior side of the transmissive member by a chart stone chipping test and fracture velocity Sb in km/h measured on the surface on the vehicle exterior side of the glass member is 0.7 or more, and an area of the opening on the surface on the vehicle exterior side of the glass member is smaller than an area of the opening on the surface on the vehicle interior side of the glass member.

2. The vehicle glass according to claim 1, wherein a ratio Ea/Eb of impact fracture energy Ea in J measured on the surface on the vehicle exterior side of the transmissive member by a cemented carbide conical pin impact test and impact fracture energy Eb in J measured on the surface on the vehicle exterior side of the glass member is 1.2 or more.

3. The vehicle glass according to claim 1, wherein crack occurrence speed Sc in km/h measured on the surface on the vehicle exterior side of the transmissive member by a cemented carbide conical pin impact test is 25 or more.

4. The vehicle glass according to claim 1, wherein the transmissive member includes a base material comprising at least one selected from the group consisting of Si, Ge, ZnS, and chalcogenide glass.

5. The vehicle glass according to claim 4, wherein the base material is made of Si.

6. The vehicle glass according to claim 5, wherein the transmissive member includes a first functional film on a surface on the vehicle exterior side of the base material.

7. The vehicle glass according to claim 6, wherein the first functional film includes an outermost layer on the vehicle exterior side and comprising a main component comprising $ZrO_2$.

8. The vehicle glass according to claim 4, wherein the base material has a thickness in a range of 1 mm to 5 mm.

9. The vehicle glass according to claim 1, wherein a length of a longest straight line among straight lines connecting two points in a surface on the vehicle exterior side of the opening is in a range of 30 mm to 105 mm.

10. The vehicle glass according to claim 1, further comprising:

a protective member positioned on the vehicle interior side than the transmissive member and overlapping at least a part of the transmissive member when viewed from a direction orthogonal to the surface on the vehicle exterior side of the transmissive member.

11. The vehicle glass according to claim 1, further comprising:

a frame member positioned at an outer peripheral edge of the transmissive member such that the transmissive member is attached to the opening via the frame member.

12. The vehicle glass according to claim 1, wherein an area of the opening on the surface on the vehicle exterior side of the glass member is in a range of 700 $mm^2$ to 8700 $mm^2$ and an area of the opening on the surface on the vehicle interior side of the glass member is in a range of 900 $mm^2$ to 9000 $mm^2$.

13. The vehicle glass according to claim 2, wherein crack occurrence speed Sc in km/h measured on the surface on the vehicle exterior side of the transmissive member by a cemented carbide conical pin impact test is 25 or more.

14. The vehicle glass according to claim 2, wherein the transmissive member includes a base material comprising at least one selected from the group consisting of Si, Ge, ZnS, and chalcogenide glass.

15. The vehicle glass according to claim 14, wherein the base material is made of Si.

16. The vehicle glass according to claim 15, wherein the transmissive member includes a first functional film on a surface on the vehicle exterior side of the base material.

17. The vehicle glass according to claim 16, wherein the first functional film includes an outermost layer on the vehicle exterior side and comprising a main component comprising $ZrO_2$.

18. The vehicle glass according to claim 14, wherein the base material has a thickness in a range of 1 mm to 5 mm.

19. The vehicle glass according to claim 2, wherein a length of a longest straight line among straight lines connecting two points in a surface on the vehicle exterior side of the opening is in a range of 30 mm to 105 mm.

20. The vehicle glass according to claim 2, further comprising:

a protective member positioned on the vehicle interior side than the transmissive member and overlapping at least a part of the transmissive member when viewed from a direction orthogonal to the surface on the vehicle exterior side of the transmissive member.

* * * * *